(12) United States Patent
Harinstein et al.

(10) Patent No.: US 8,745,226 B2
(45) Date of Patent: Jun. 3, 2014

(54) CUSTOMIZATION OF CONTENT AND ADVERTISEMENTS IN PUBLICATIONS

(75) Inventors: Jason Harinstein, Mountain View, CA (US); Karen Roter Davis, San Jose, CA (US)

(73) Assignee: Google Inc., Mountain View, CA (US)

( * ) Notice: Subject to any disclaimer, the term of this patent is extended or adjusted under 35 U.S.C. 154(b) by 980 days.

(21) Appl. No.: 11/381,221

(22) Filed: May 2, 2006

(65) Prior Publication Data

US 2007/0260671 A1 Nov. 8, 2007

(51) Int. Cl.
*G06F 15/173* (2006.01)
*G06F 7/00* (2006.01)
*G06F 17/30* (2006.01)

(52) U.S. Cl.
USPC ........................................ 709/226; 707/706

(58) Field of Classification Search
USPC .............. 709/226; 707/100; 705/1, 14, 26–27
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,009,410 A * | 12/1999 | LeMole et al. | 705/14.54 |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,385,592 B1 * | 5/2002 | Angles et al. | 705/14 |
| 6,401,075 B1 | 6/2002 | Mason et al. | |
| 6,460,036 B1 * | 10/2002 | Herz | 707/748 |
| 6,496,857 B1 * | 12/2002 | Dustin et al. | 709/219 |
| 6,516,312 B1 * | 2/2003 | Kraft et al. | 707/3 |
| 6,985,882 B1 | 1/2006 | Del Sesto | |
| 7,039,599 B2 | 5/2006 | Merriman | |
| 7,136,875 B2 | 11/2006 | Anderson et al. | |
| 7,483,871 B2 * | 1/2009 | Herz | 1/1 |
| 2002/0040374 A1 * | 4/2002 | Kent | 707/516 |
| 2002/0078171 A1 | 6/2002 | Schneider | |
| 2004/0172405 A1 * | 9/2004 | Farran | 707/100 |
| 2004/0267725 A1 * | 12/2004 | Harik | 707/3 |
| 2005/0091109 A1 | 4/2005 | Howard et al. | |
| 2005/0131872 A1 * | 6/2005 | Calbucci et al. | 707/3 |

(Continued)

FOREIGN PATENT DOCUMENTS

| | | | |
|---|---|---|---|
| JP | 2001-134581 A | 5/2001 | |
| JP | 2001-209722 A | 8/2001 | |

(Continued)

OTHER PUBLICATIONS

Reexamination of U.S. Appl. No. 95/001,073, Stone et al.

(Continued)

*Primary Examiner* — Ashok B. Patel
*Assistant Examiner* — James Baron
(74) *Attorney, Agent, or Firm* — Harrity & Harrity, LLP

(57) ABSTRACT

A method includes receiving personalized content from a plurality of content sources. The personalized content is based on user input. The method further includes receiving a personalized advertisement based on user input, and creating a customized publication including the personalized content and the personalized advertisement.

30 Claims, 18 Drawing Sheets

(56) References Cited

U.S. PATENT DOCUMENTS

| | | | |
|---|---|---|---|
| 2005/0222989 A1* | 10/2005 | Haveliwala et al. | 707/3 |
| 2006/0074984 A1* | 4/2006 | Milener et al. | 707/104.1 |
| 2006/0212350 A1* | 9/2006 | Ellis et al. | 705/14 |
| 2007/0061196 A1 | 3/2007 | Axe et al. | |
| 2007/0179933 A1* | 8/2007 | Lee et al. | 707/3 |
| 2008/0046411 A1* | 2/2008 | Lee | 707/3 |
| 2008/0059258 A1* | 3/2008 | Lee | 705/7 |
| 2008/0109285 A1* | 5/2008 | Reuther et al. | 705/7 |
| 2008/0313164 A1* | 12/2008 | Lee et al. | 707/5 |
| 2009/0192899 A1* | 7/2009 | Skillen et al. | 705/14 |
| 2012/0016735 A1* | 1/2012 | Park et al. | 705/14.42 |
| 2012/0072286 A1* | 3/2012 | Kilar et al. | 705/14.55 |
| 2012/0191540 A1* | 7/2012 | Wilson et al. | 705/14.53 |
| 2012/0290393 A1* | 11/2012 | Johansson et al. | 705/14.55 |
| 2012/0296744 A1* | 11/2012 | Cue et al. | 705/14.55 |

FOREIGN PATENT DOCUMENTS

| | | | |
|---|---|---|---|
| JP | 2002-007450 A | 1/2002 | |
| JP | 2002-049840 A | 2/2002 | |
| JP | 2002/099808 | 4/2002 | |
| JP | 2002-135558 | 5/2002 | |
| JP | 2002-222135 | 8/2002 | |
| JP | 2002-251559 | 9/2002 | |
| JP | 2002-269441 | 9/2002 | |
| JP | 2002-354547 A | 12/2002 | |
| JP | 2003-196540 A | 7/2003 | |
| JP | 2004-199241 A | 7/2004 | |
| JP | 2004-286775 | 10/2004 | |
| JP | 2005-251021 | 9/2005 | |
| WO | WO 97/21183 | 6/1997 | |
| WO | 2004/017263 | 2/2004 | |
| WO | 2004/111771 | 12/2004 | |

OTHER PUBLICATIONS

Reexamination of U.S. Appl. No. 95/001,061, Stone et al.
Reexamination of U.S. Appl. No. 95/001,069, Dean et al.
Reexamination of U.S. Appl. No. 95/001,068, Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., *Advertising on the Internet*, $2^{nd}$ Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Statement Regarding References in 1449 Form.
Notification of Transmittal of the International Search Report and the Written Opinion of the International Searching Authority, or the Declaration, 9 pages.

* cited by examiner

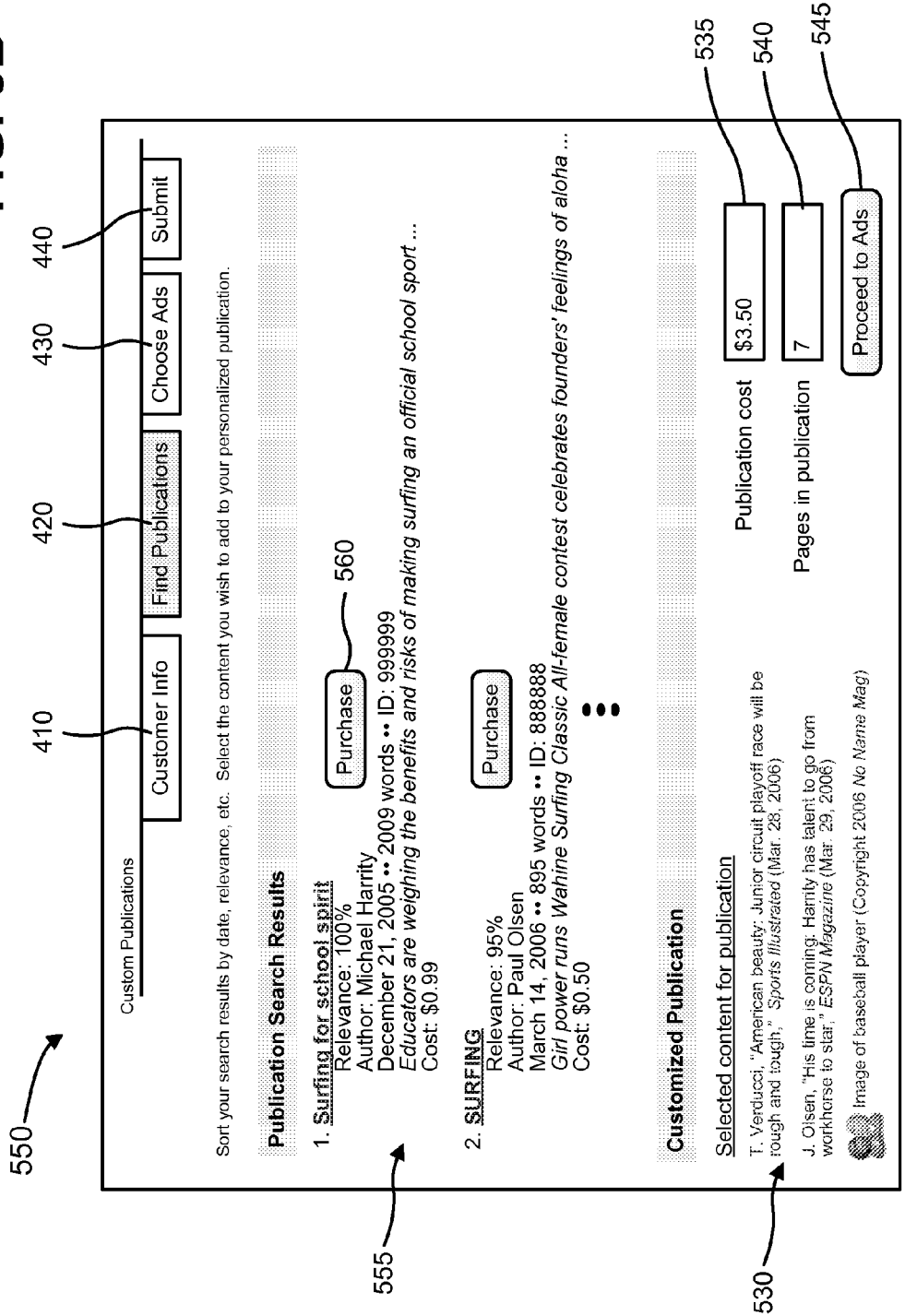

FIG. 9B

Custom Publications

Make A New Ad

Provide your ad title, text, image and logo in the fields below. The information you enter will be displayed in the ad preview as you build your ad. Review your ad to ensure you've entered the correct information, name your ad so you can recognize later in the summary view, then click "Save".

Fake Ad
Your ad description goes here. It can be up to 200 characters in length and will be wrapped according to the publication's page size www.fakead.com (800) 888-8888

Logo

— 970

Headline  [Fake Ad]

Image     [         ]

Description [        ]

Logo        [   ▷   ]  ▲ Add new image — 980

Display URL [www.fakead.com]

Phone       [800 888 8888]

Ad name     [fakead]

[Save] — 990

905

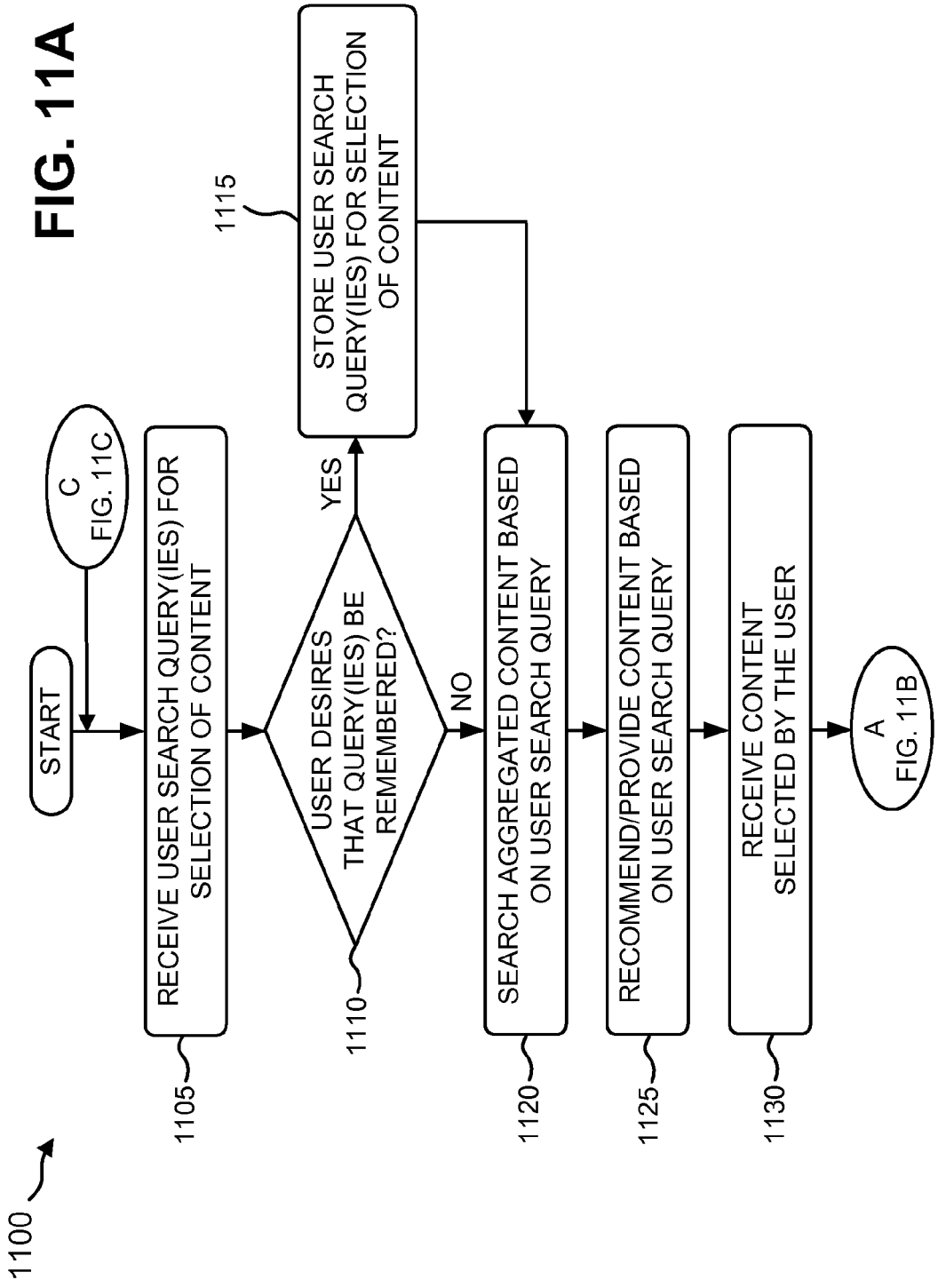

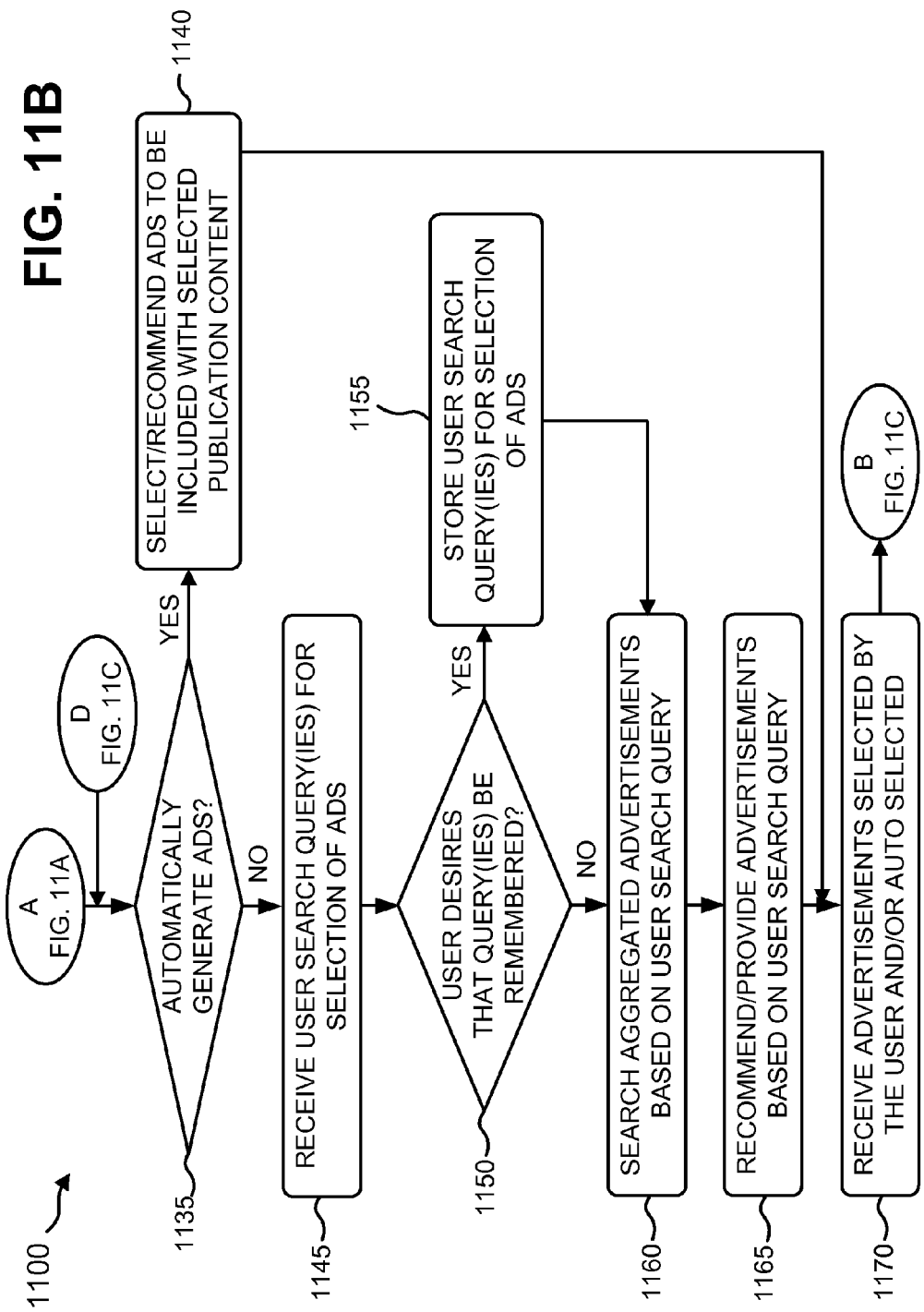

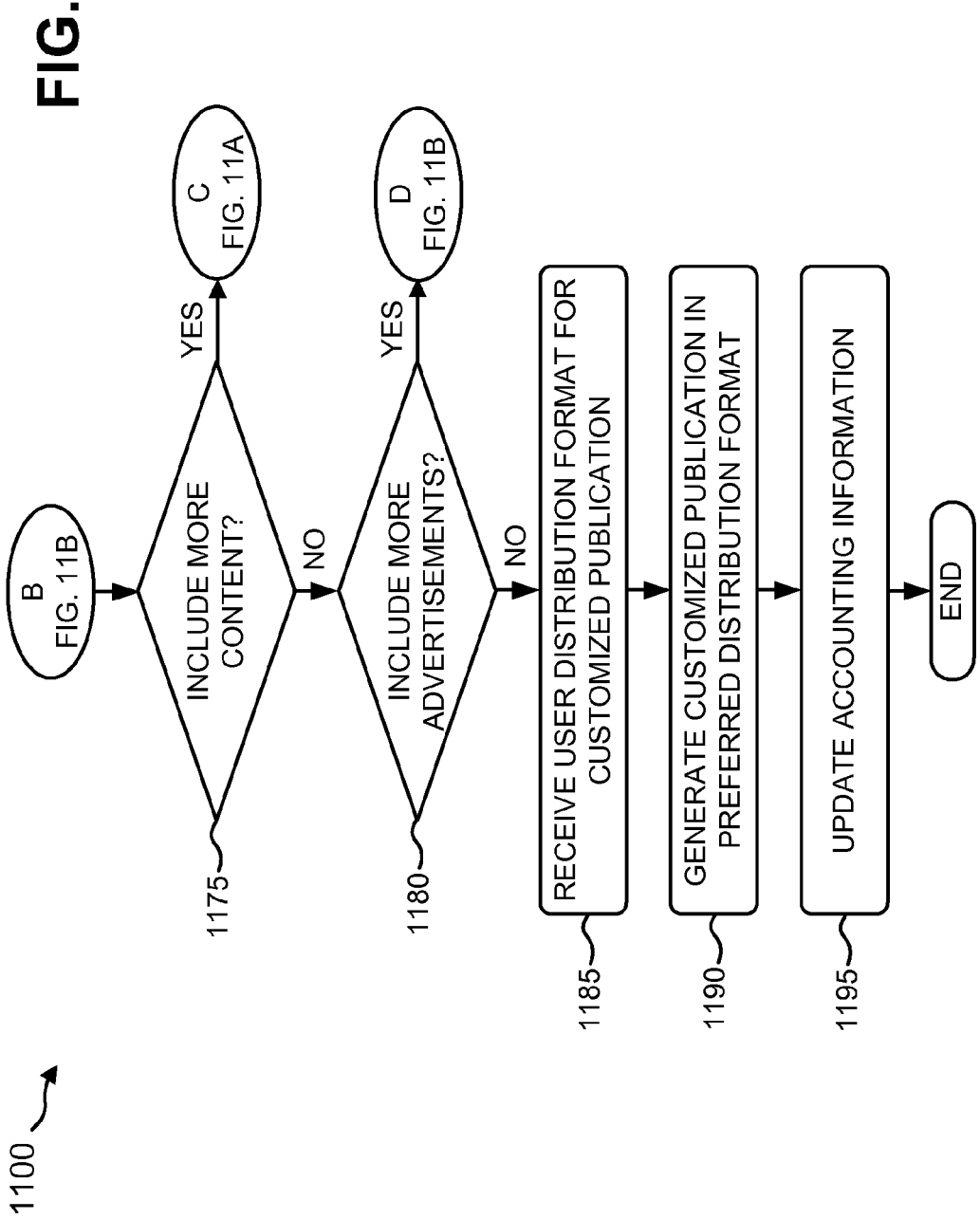

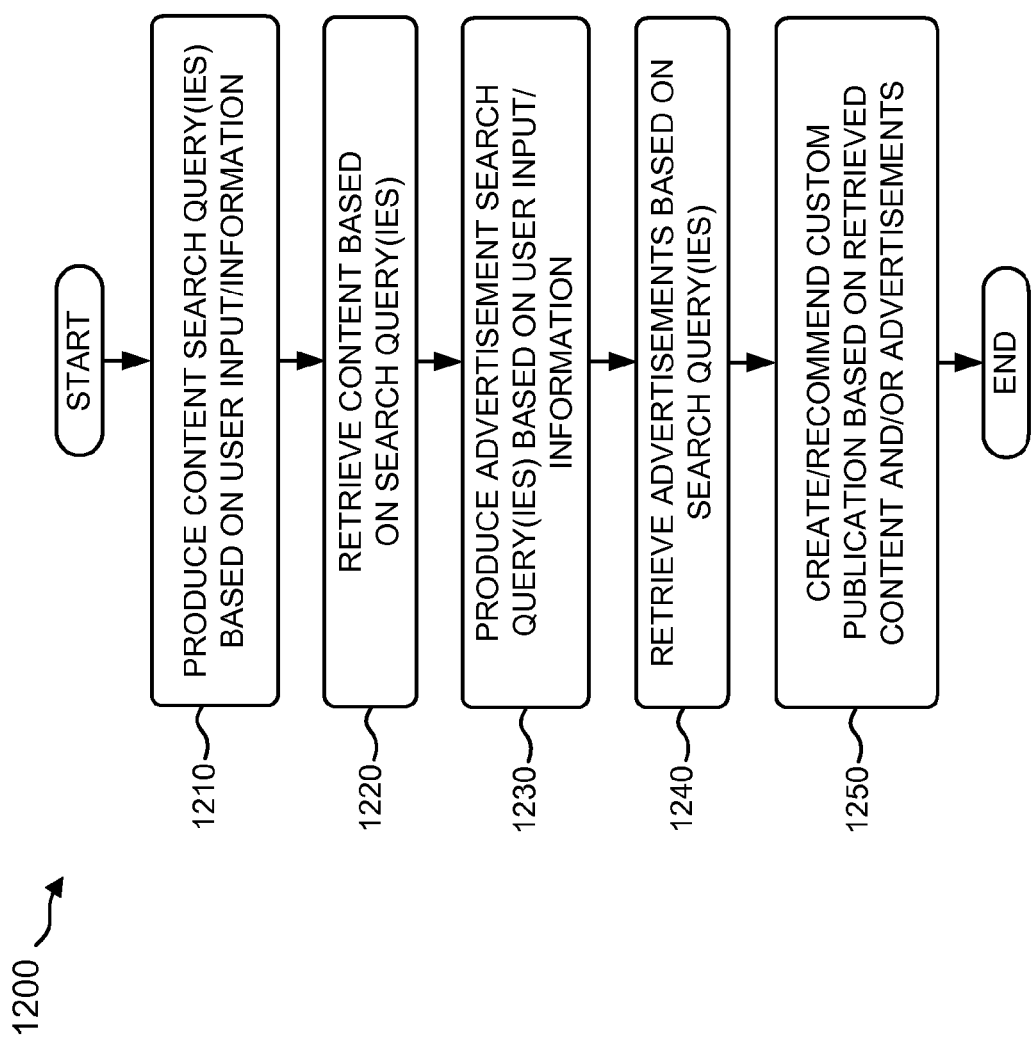

CUSTOMIZATION OF CONTENT AND ADVERTISEMENTS IN PUBLICATIONS

BACKGROUND

1. Field of the Invention

Implementations described herein relate generally to document processing, and, more particularly, to customization of content and advertisements in publications.

2. Description of Related Art

Consumers may purchase a variety of publications in various forms, e.g., print form (e.g., newspapers, magazines, books, etc.), electronic form (e.g., electronic newspapers, electronic books ("e-Books"), electronic magazines, etc.), etc. The publishers define the content of such publications, and advertisers define which advertisements (ads) may be seen in the publications. Since consumers have no control over publication content or advertisements, they may purchase a publication that contains at least some content and advertisements that may be of no interest to them.

Publishers often lack insight into the profiles of consumers who purchase their publications, and, accordingly, miss out on subscription and advertisement revenue due to a lack of personalized content and advertisements. Likewise, consumer targeting for advertisers is limited, and there is virtually no standardization for ad sizes (e.g., an ad that is supposed to be a full page may need to be reduced in size to fit within a publication). Accordingly, advertisers sometimes purchase sub-optimal or worthless ad space in an attempt to reach their target markets. Advertisers also have difficulty identifying new prospective market segments to target because they have limited insight into the desires and reactions of consumers.

Existing news aggregation services search out, and aggregate, news content published on web pages throughout the Internet. In response to a search query from a user, or when a user browses a newspaper section of the news aggregation service, the news aggregation service presents a list of stories, from the aggregated news content, relevant to the query or to the newspaper section requested, with each story involving a group of articles from different publications dealing with the same topic. To keep abreast of developments in the news, users must access the news aggregation service, re-enter a search query and view relevant news stories. Unfortunately, such services fail to enable a consumer to create a customized publication containing personalized content from a variety of sources (e.g., electronic newspapers, electronic books, electronic magazines, online encyclopedias, web sites, blogs, blog posts, etc.), and containing personalized advertisements.

A few systems customize industry information for business executives. However, such systems are often manual, not scalable, do not include ad targeting, and do not offer selection of personalized (i.e., consumer selected) advertisements. Such systems also do not allow the business executive to create a customized publication containing personalized content from a variety of sources.

Variable data printing exists for personalized direct mail campaigns. Variable data printing is a form of on-demand printing in which all the documents in a print run are similar but not identical. For example, when printing personalized letters to be mailed to customers, each letter may have the same basic layout, but there may be a different customer name and address on each letter. Variable data printed information fails to take consumer preferences in account, i.e., is not a customized publication created by a consumer, and may be based on demographics, geography, and/or generic mailing lists.

SUMMARY

According to one aspect, a method may include receiving personalized content from a plurality of content sources. The personalized content may be based on user input. The method may further include receiving a personalized advertisement based on user input, and creating a customized publication including the personalized content and the personalized advertisement.

According to another aspect, a method may include receiving personalized content from a plurality of content sources. The personalized content may be based on user input. The method may further include receiving a personalized advertisement based on the personalized content, and creating a customized publication including the personalized content and the personalized advertisement.

According to still another aspect, a method may include receiving personalized content from a plurality of content sources. The personalized content may be based on user input. The method may further include receiving a personalized advertisement based on user input, and creating an on-demand point-of-sale printed publication including the personalized content and the personalized advertisement.

According to a further aspect, a method may include receiving personalized content from a plurality of content sources. The personalized content may be based on user input. The method may further include receiving a personalized advertisement based on the personalized content, and creating a printed publication including the user selected content and the relevant advertisement.

According to another aspect, a method may include receiving content from a plurality of content providers, aggregating the content, and receiving personalized content from the aggregated content. The method may also include receiving advertisements from a plurality of advertisers, aggregating the advertisements, and receiving a personalized advertisement from the aggregated advertisements. The method may further include creating a customized publication including the personalized content and the personalized advertisement.

According to a further aspect, a method may include producing a content search query based on user information, retrieving personalized content based on the content search query, and producing an advertisement search query based on user information. The method may also include retrieving a personalized advertisement based on the advertisement search query, and creating a customized publication including the personalized content and the personalized advertisement.

According to yet another aspect, a system may include means for receiving content from a plurality of content providers, means for receiving personalized content from the content, means for receiving advertisements from a plurality of advertisers, and means for associating the content with the advertisements. The system may also include means for receiving a personalized advertisement from the advertisements based on the association of the personalized advertisement and the personalized content, and means for creating a customized publication including the personalized content and the personalized advertisement.

According to still another aspect, a system may include means for receiving user input specifying personalized content, means for receiving user input specifying a personalized advertisement relevant to the personalized content, and means for creating a customized publication including the personalized content and the personalized advertisement.

According to still yet another aspect, a device may include a memory to store instructions, and a processor to execute the instructions in the memory to receive personalized content, receive a personalized advertisement based on the personalized content, and create a customized publication including the personalized content and the personalized advertisement.

According to another aspect, a computer-readable medium may store computer-executable instructions, and may include instructions for receiving personalized content, instructions for receiving a personalized advertisement based on the personalized content, and instructions for creating a customized publication including the personalized content and the personalized advertisement.

According to still another aspect, a method may include associating a plurality of content search queries with a user, and periodically searching content using the plurality of content search queries. The method may also include associating a plurality of advertisement search queries with a user, periodically searching advertisements using the plurality of advertisement search queries, and periodically providing the selected content and advertisements to a customized publication associated with the user using results from the periodic searches of the content and the advertisements.

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIGS. 11A-11C are flowcharts of an exemplary process for creating a customized publication containing personalized content and advertisements according to an implementation consistent with principles of the invention; and FIG. 12 is a flowchart of an exemplary process for automatically creating and/or recommending a customized publication based on user provided information and/or information about the user according to an implementation consistent with principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Systems and methods consistent with principles of the invention may provide an on-demand point-of-sale printed publication containing user selected content from multiple content sources and relevant advertisements (e.g., advertisements selected based on user input, advertisements related to the content, or a combination of the two). Determination of the relevant advertisements may take into account information about the point-of-sale (e.g., time of day, location, type of store, type of transaction being consummated, etc.) of the printed publication. For example, a consumer or user may select a variety of user selected content from a variety of publications to include in the on-demand point-of-sale printed publication, and may select relevant advertisements from a variety of advertisers to include in the on-demand point-of-sale printed publication.

"Content," as the term is used herein, is to be broadly interpreted to include any machine-readable and machine-storable work product, document, electronic media, print media, etc. Content may include, for example, information contained in documents, print media (e.g., newspapers, magazines, books, encyclopedias, etc.), electronic newspapers, electronic books, electronic magazines, online encyclopedias, electronic media (e.g., image files, audio files, video files, web casts, podcasts, etc.), etc.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a blog post, a web advertisement, any of the aforementioned content, advertisements, etc. In the context of the Internet, a common document is a web page. Documents often include textual information and may include embedded information (such as meta information, images, hyperlinks, etc.) and/or embedded instructions (such as Javascript, etc.).

A "link," as the term is used herein, is to be broadly interpreted to include any reference to/from a document from/to another document or another part of the same document.

A "publication," as the term is used herein, is to be broadly interpreted to include any medium on which content may be presented.

"Personalized," as the term is used herein, is to be broadly interpreted to include any content (e.g., publication content and/or advertisement content) which may be selected by a user, recommended to a user (e.g., based on user information), automatically selected based on user information, and/or any combination of the three.

Figure 1:
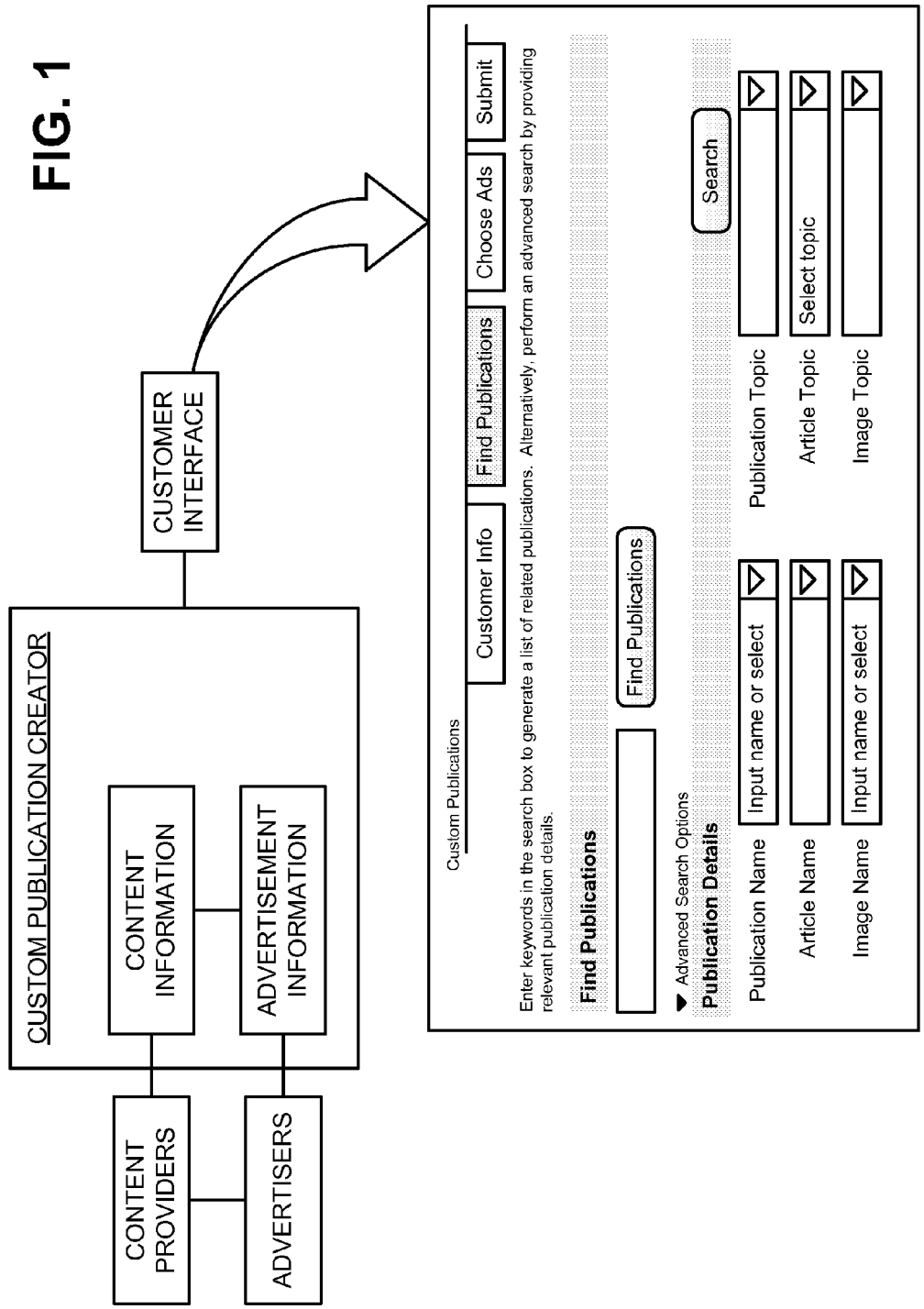
FIG. 1 is an exemplary diagram illustrating a concept consistent with principles of the invention.

FIG. 1 is an exemplary diagram illustrating a concept consistent with principles of the invention. As shown in FIG. 1, a consumer or user may create a customized publication using a customer interface connected to a custom publication creator. The custom publication creator may connect to content providers (e.g., publishers of content) and advertisers. The content providers may provide content to a content information portion of the custom publication creator. For example, in one implementation, Newsweek magazine may provide its weekly articles, images, etc. to the custom publication creator, and the custom publication creator may store this information in its content information portion along with previous information obtained from Newsweek. In another implementation, an independent author/journalist or online provider (e.g., a blogger) may provide his/her article(s) to the custom publication creator for storage within the content information portion.

The advertisers may provide advertisement information to an advertisement information portion of the custom publication creator. For example, in one implementation, advertisers may provide pre-created advertisements to the custom publication creator for storage in the advertisement information portion of the custom publication creator along with previously stored advertisements. In another implementation, advertisers may create advertisements using the custom publication creator for storage in the advertisement information portion. Advertisers may connect to content providers and select specific content and/or demographic, psychographic, and/or behavioral targets they wish to associate with their advertisements. For example, a truck manufacturer may desire to associate their truck advertisements with content relating to trucks (e.g., a truck magazine article). In another example, advertisers may wish to target males having an age of eighteen to thirty-four, who live in Texas, and drink coffee.

As further shown in FIG. 1, the customer interface connected to the custom publication creator may provide a variety of options to a consumer wishing to create a customized publication. For example, a user may select content, classes of content, authors, sections from printed publications, etc., as well as advertisers, classes of advertisements of interest, etc. Advertisers may target individual consumers (manually or via automation) based on geography, behavior, demographics, collaborative filtering (i.e., method of making automatic predictions about the interests of a user by collecting taste information from many users, where the underlying assumption is that those who agreed in the past tend to agree again in the future), content, psychographics, content or advertisement selection, and/or other data collected from the consumer during registration and/or during creation of the customized publication.

In the exemplary interface shown in FIG. 1, a consumer may select a "Customer Info" tab (e.g., to edit and/or input customer information), a "Find Publications" tab (e.g., to search for and/or select content to provide in the customized publication), a "Choose Ads" tab (e.g., to search for and/or select advertisements to provide in the customized publication), and a "Submit" tab (e.g., to pay for the customized publication and/or request the customized publication). FIG. 1 shows an exemplary document that may be displayed when the "Find Publications" tab is selected by the user. Although FIG. 1 shows exemplary tabs, more or less tabs may be included, and/or the functions of one or more tabs may be incorporated under another tab (e.g., the functions of the "Choose Ads" tab and "Submit" tab may be included under the "Find Publications" tab).

A user may enter keywords in a search box to generate a list of content related to the search query. Alternatively, a user may perform an advanced search by providing relevant content information. For example, a user may input a publication name, an article name, an author's name, an image name, a publication topic, an article topic, an image topic, etc., or combinations thereof, and then select a "Search" button to generate a list of content related to the advanced search query.

The user may select the desired content from the generated list(s) of content, and may proceed to select advertisements to include in the customized publication. The user may pay for the customized publication and request a copy of the publication in a variety of formats (e.g., a printed publication).

Exemplary Network Configuration

Figure 2:
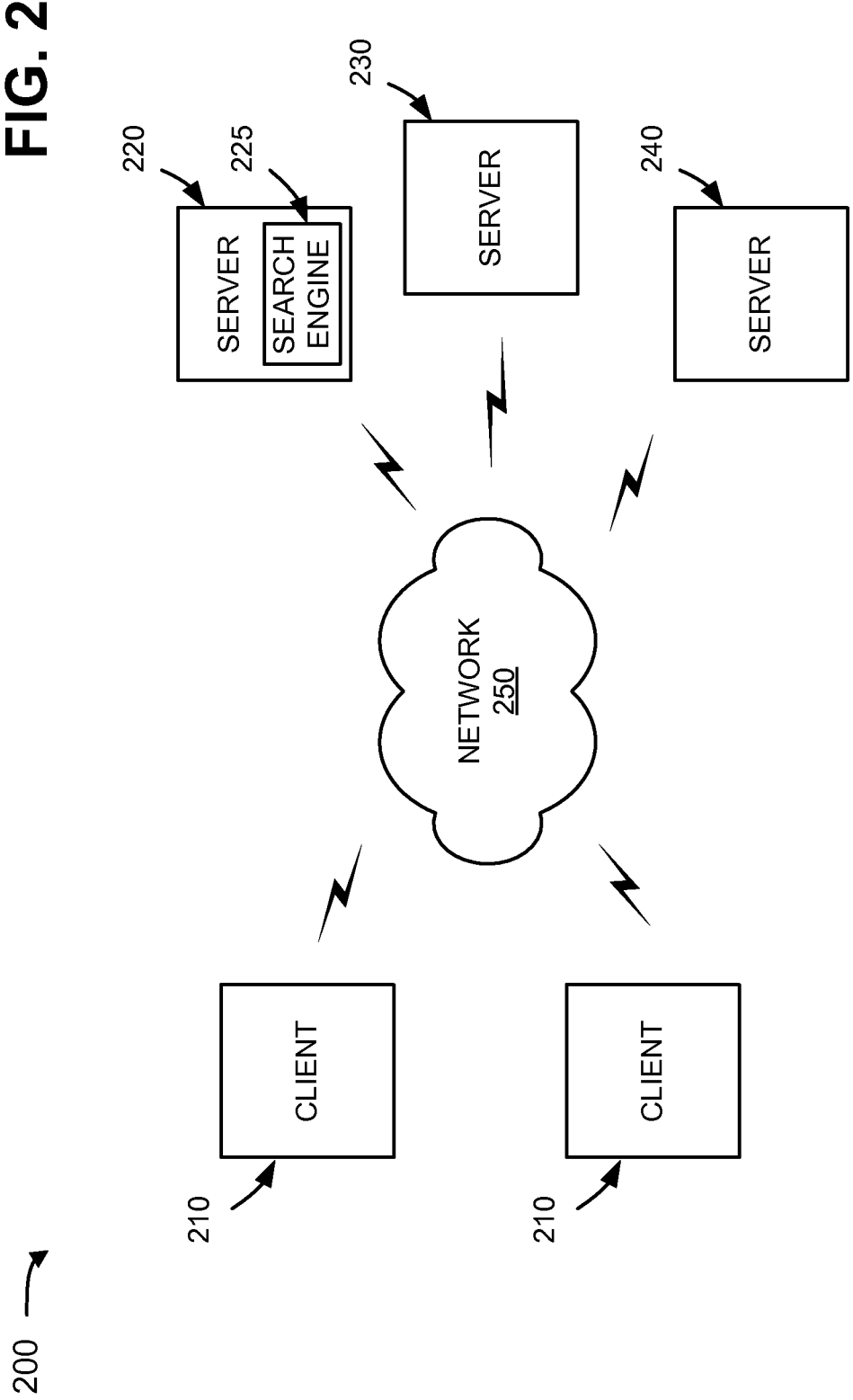
FIG. 2 is an exemplary diagram of a network in which systems and methods consistent with principles of the invention may be implemented.

FIG. 2 is an exemplary diagram of a network 200 in which systems and methods consistent with principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with principles of the invention.

In an implementation consistent with principles of the invention, server 220 may include a search engine 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
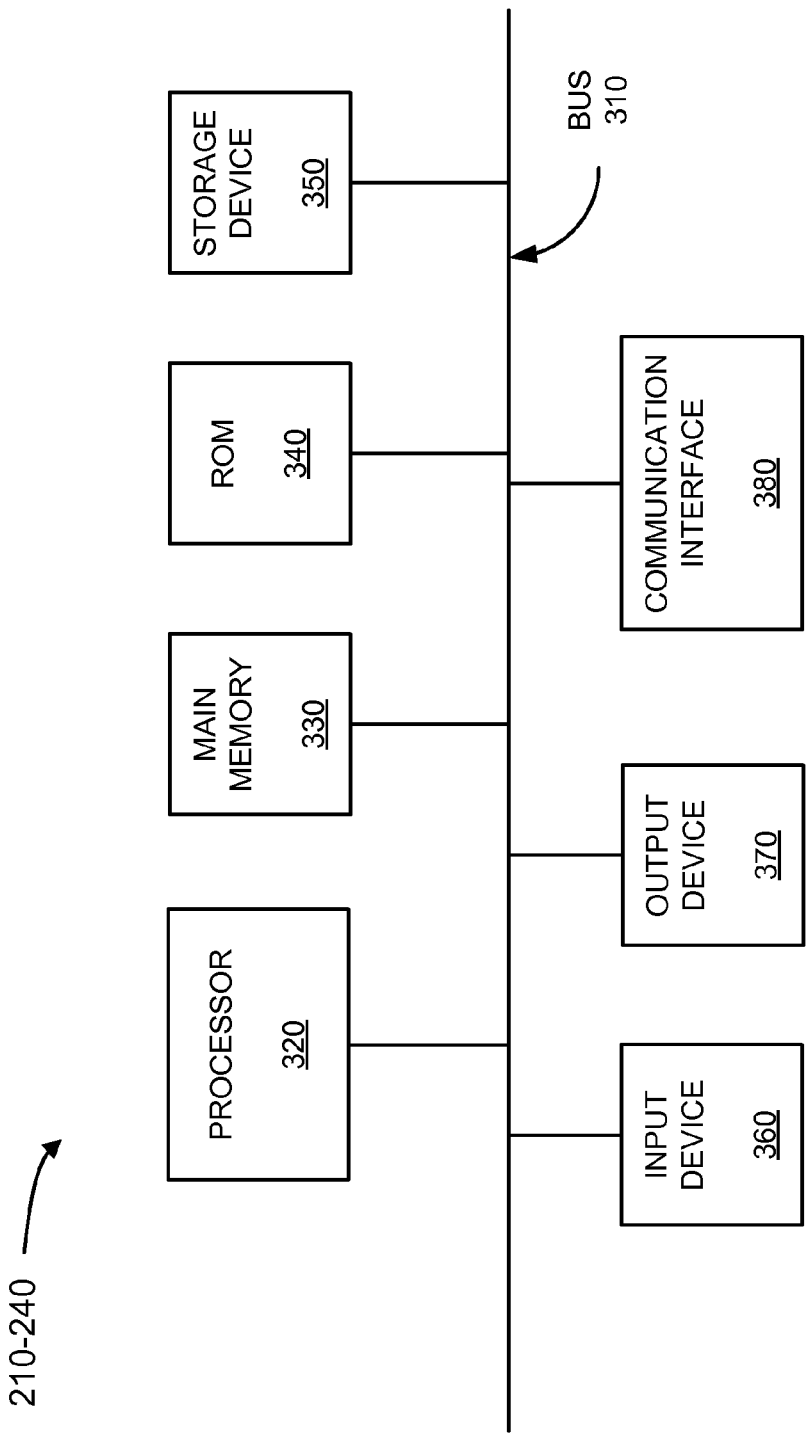
FIG. 3 is an exemplary diagram of a client or server of FIG. 2 according to an implementation consistent with principles of the invention.

FIG. 3 is an exemplary diagram of a client or server entity (hereinafter called "client/server entity"), which may correspond to one or more of clients 210 and/or servers 220-240, according to an implementation consistent with principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with principles of the invention, may perform certain operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

As will be described in detail below, the client/server entity, consistent with principles of the invention, may correspond to the content providers, advertisers, custom publication creator, and/or customer interface shown in FIG. 1. For example, in one implementation, the custom publication creator may be implemented on any and/or all of servers 220-240, and the content providers, advertisers, and customer interface may be implemented on clients 210. In another implementation, the content providers and advertisers may be implemented on any and/or all of servers 220-240.

Exemplary Interface Documents

Figure 6A:
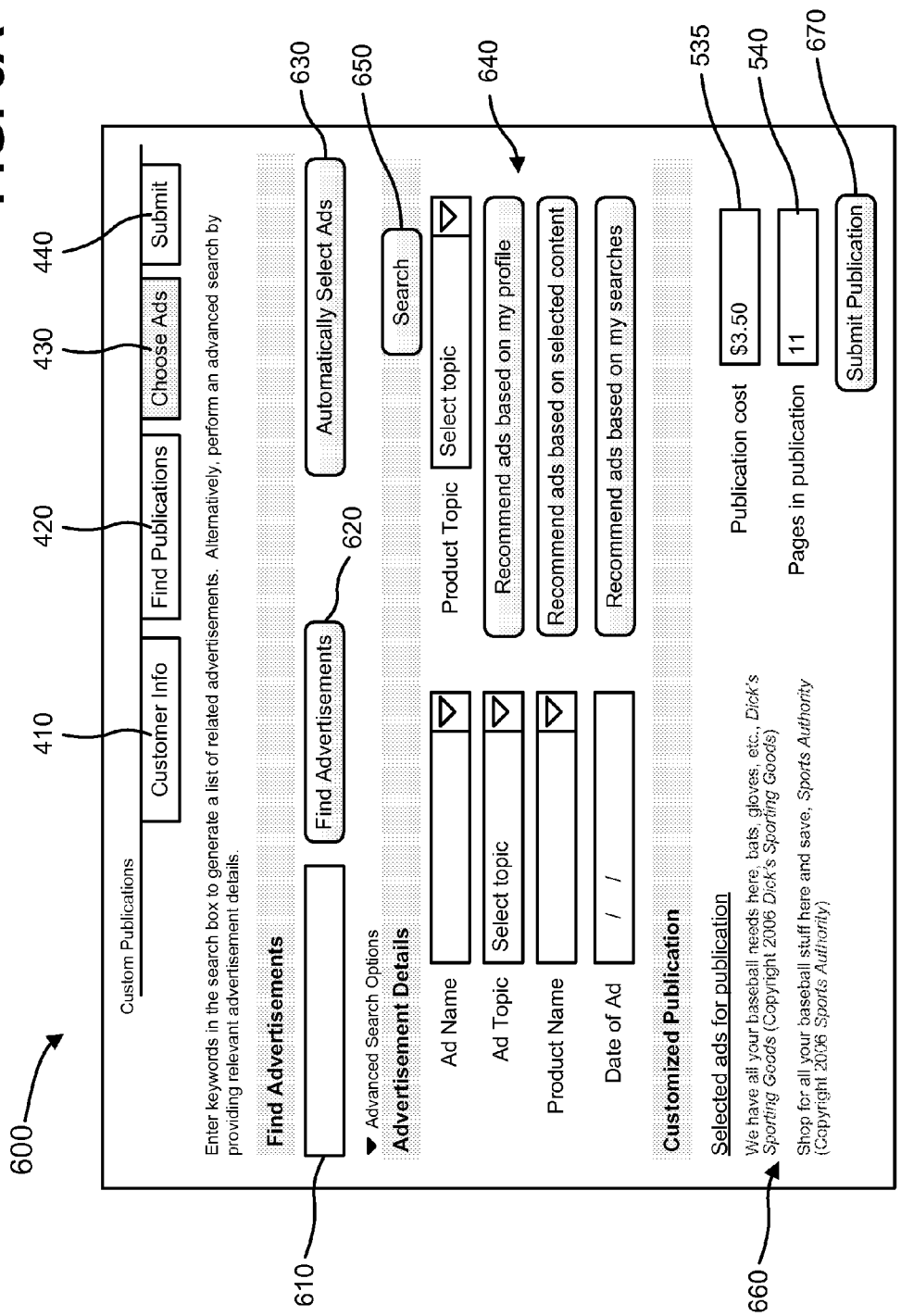
Figure 6B:
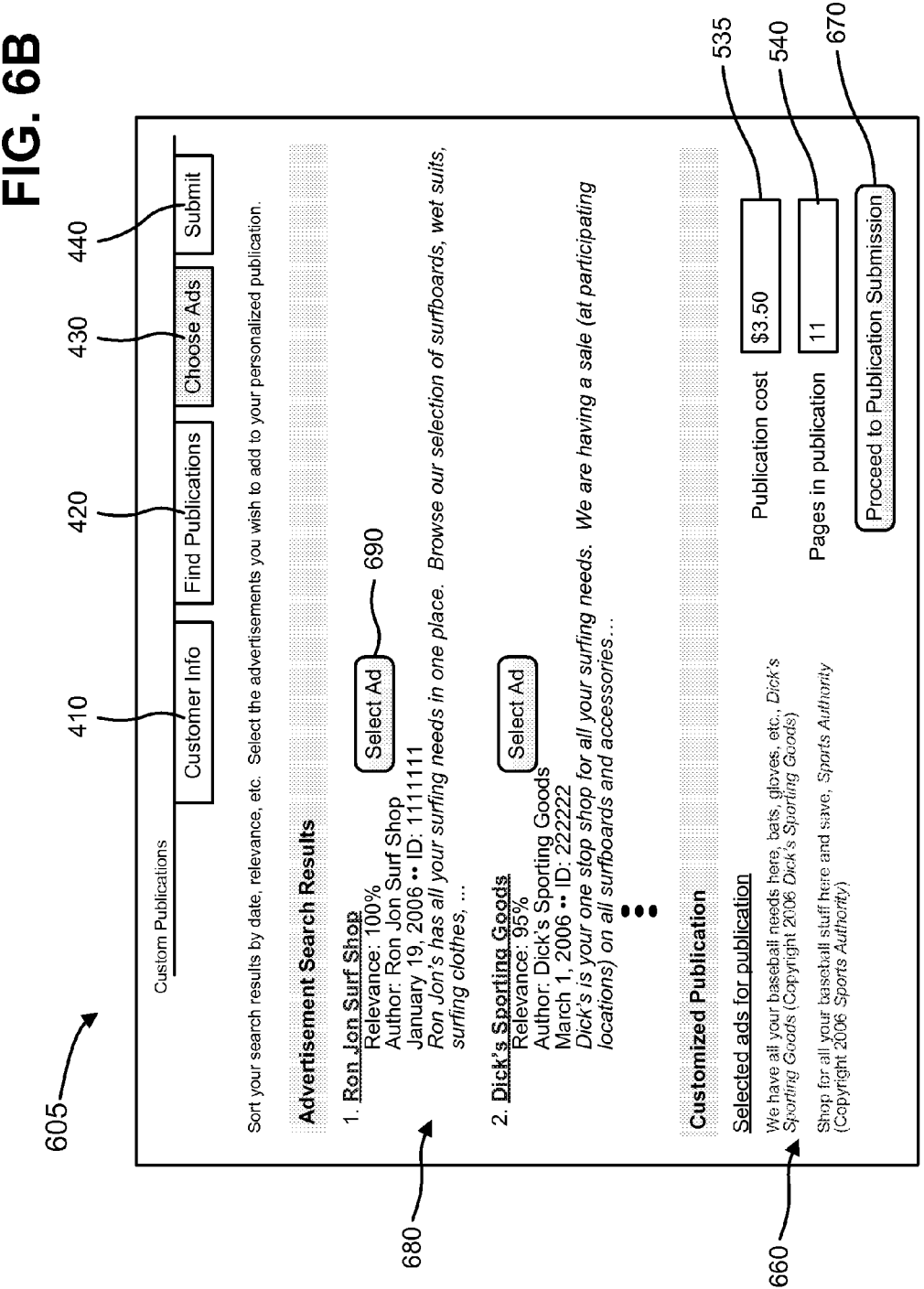
Figure 7:
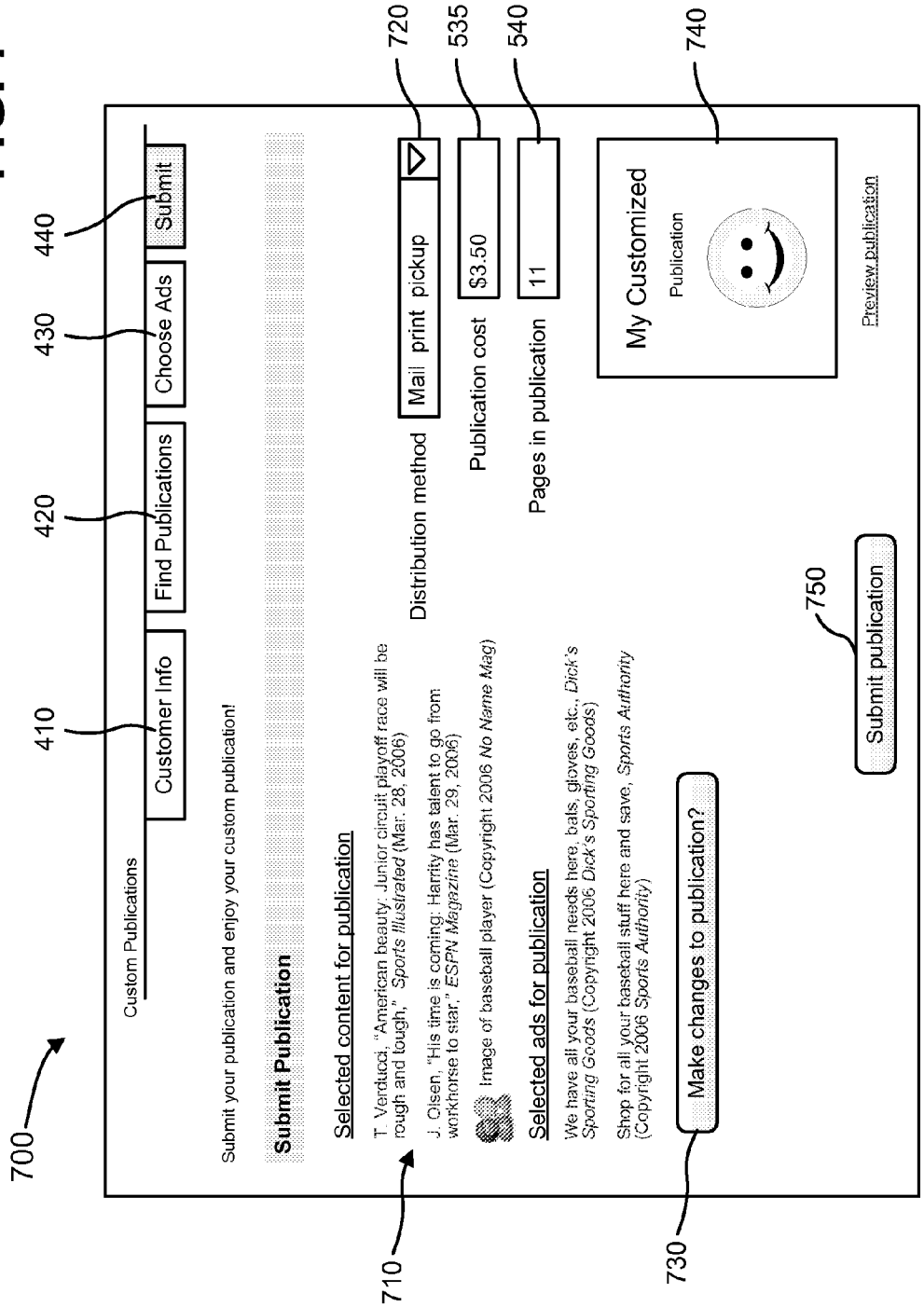
Figure 8:
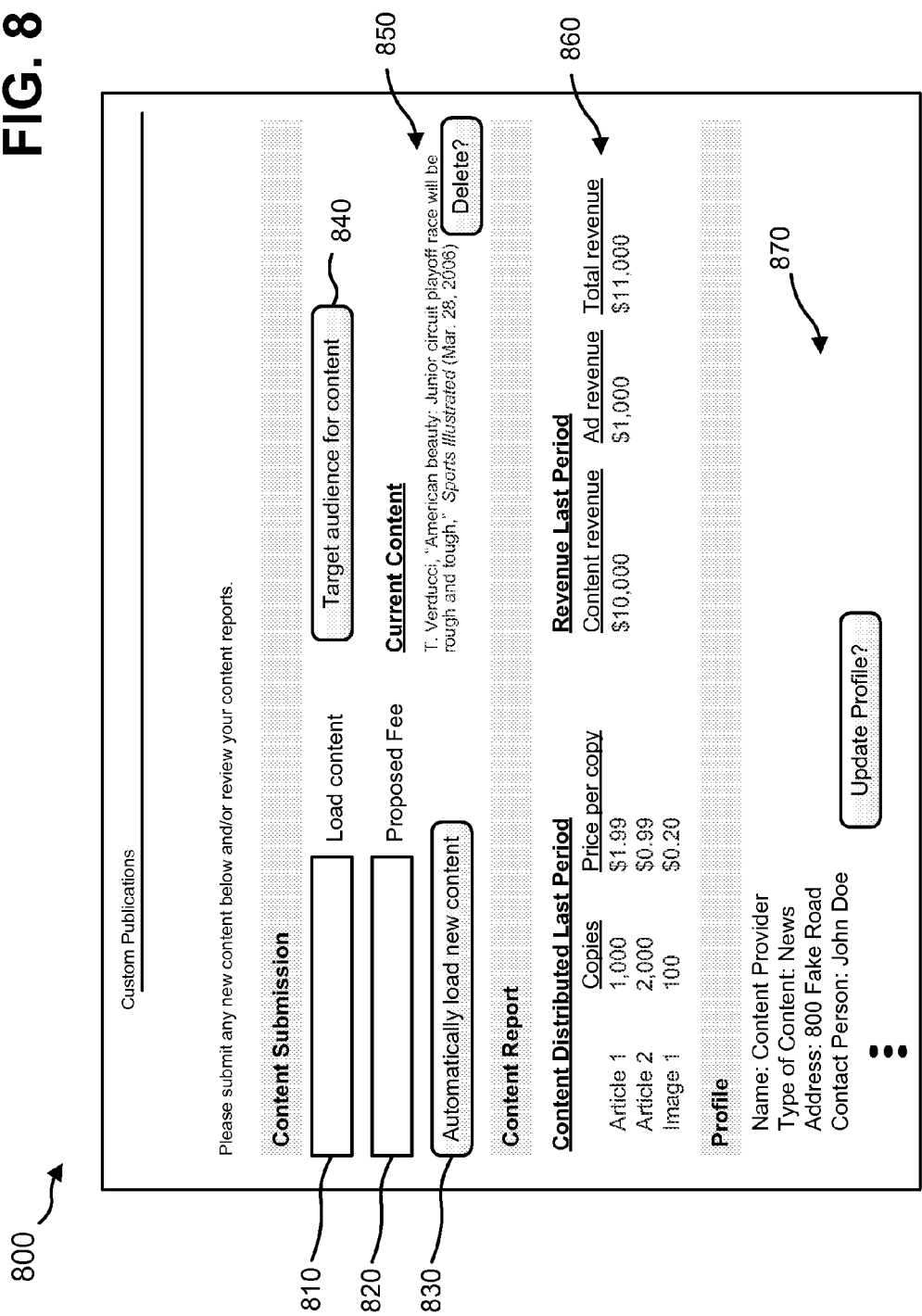
Figure 9A:
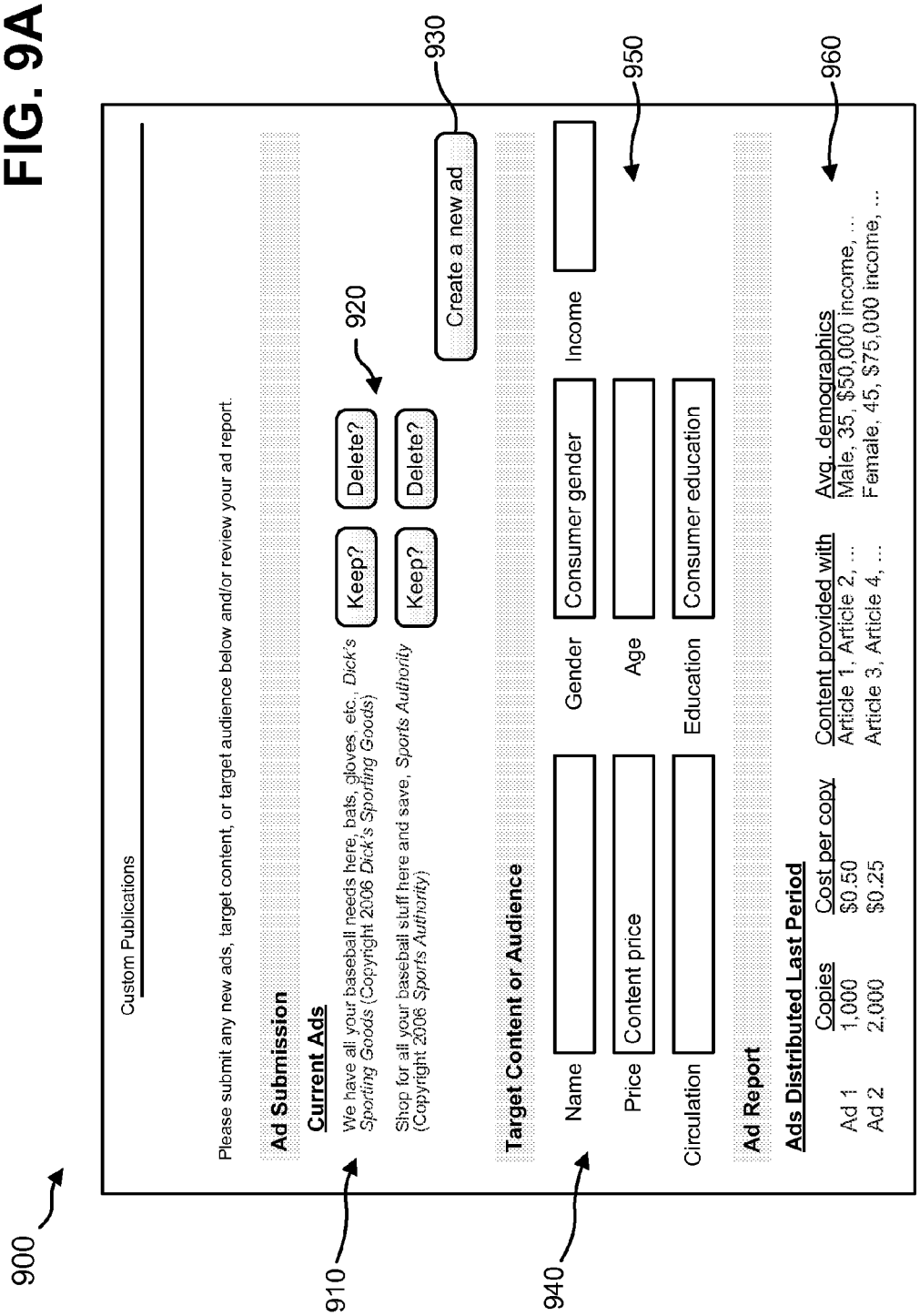

FIGS. 4-9B are exemplary diagrams of exemplary interface documents for obtaining information associated with a customized publication containing personalized content and advertisements according to implementations consistent with principles of the invention. FIGS. 4-7 are exemplary diagrams of customer interface documents for receiving customer information. FIG. 8 is an exemplary diagram of a content provider interface document for receiving content provider information. FIGS. 9A and 9B are exemplary diagrams of advertiser interface documents for receiving advertiser information.

Customer Interface

The customer interface documents shown in FIGS. 4-7 may be provided in a variety of ways. For example, in one implementation, the customer interface documents may be provided via the Internet. In another implementation, the customer interface documents may be provided via a kiosk. For example, kiosks containing the customer interface documents may be provided in stores (e.g., Target, supermarkets, retail stores, etc.) in a similar way as picture kiosks are currently provided in such stores.

Figure 4:
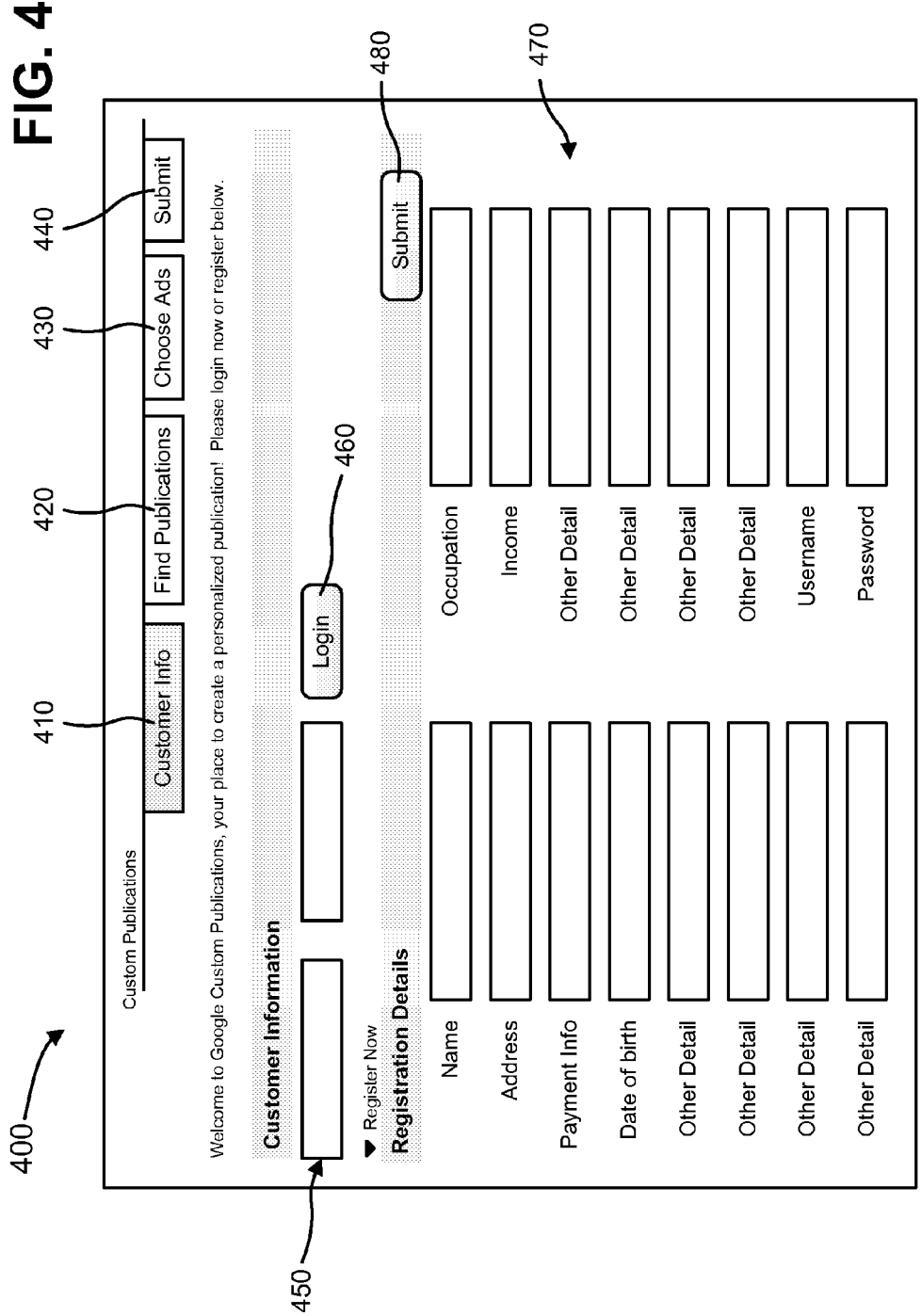
FIGS. 4-9B are exemplary diagrams of exemplary interface documents for obtaining information associated with a customized publication containing personalized content and advertisements according to implementations consistent with principles of the invention.

As shown in FIG. 4, a customer interface document 400 may include a "Customer Info" tab 410 (e.g., to edit and/or input customer information), a "Find Publications" tab 420 (e.g., to search for and/or select content to provide in the customized publication), a "Choose Ads" tab 430 (e.g., to search for and/or select advertisements to provide in the customized publication), and a "Submit" tab 440 (e.g., to pay for the customized publication and/or request the customized publication). FIG. 4 depicts an exemplary document that may be displayed when "Customer Info." tab 410 is selected by the user.

Customer interface document 400 may include a "Customer Information" section 450 where a user may enter login information. For example, in one implementation, if a user has created a profile, the user may enter a username and password, and may select a login button 460. If the user has not created a profile, then the user may register by providing the necessary information in a "Registration Details" section 470 shown in FIG. 4. "Registration Details" section 470 may request a variety of information. For example, in one implementation, "Registration Details" section 470 may request information that may aid content providers and/or advertisers in matching their content and/or advertisements with the appropriate consumers (i.e., consumers most likely to be interested in their content and/or advertisements). Such information may aid the consumer in discovering content and/or advertisements of which they may not otherwise be aware.

As shown in FIG. 4, for example, "Registration Details" section 470 may request, for example, the name, address, date of birth, occupation, and/or income of the user. "Registration Details" section 470 may further request, for example, payment information to be used for payment of the customized publication, and/or creation of a username and password. Although a variety of requested information is shown in FIG. 4, a variety of other user information may be included in "Registration Details" section 470. For example, any demographic, psychographic, and/or other user information that may be deemed useful to content providers and/or advertisers may be requested in "Registration Details" section 470. A user may submit information provided in "Registration Details" section 470 by selecting an input mechanism (e.g., a "Submit" button 480).

Figure 5A:
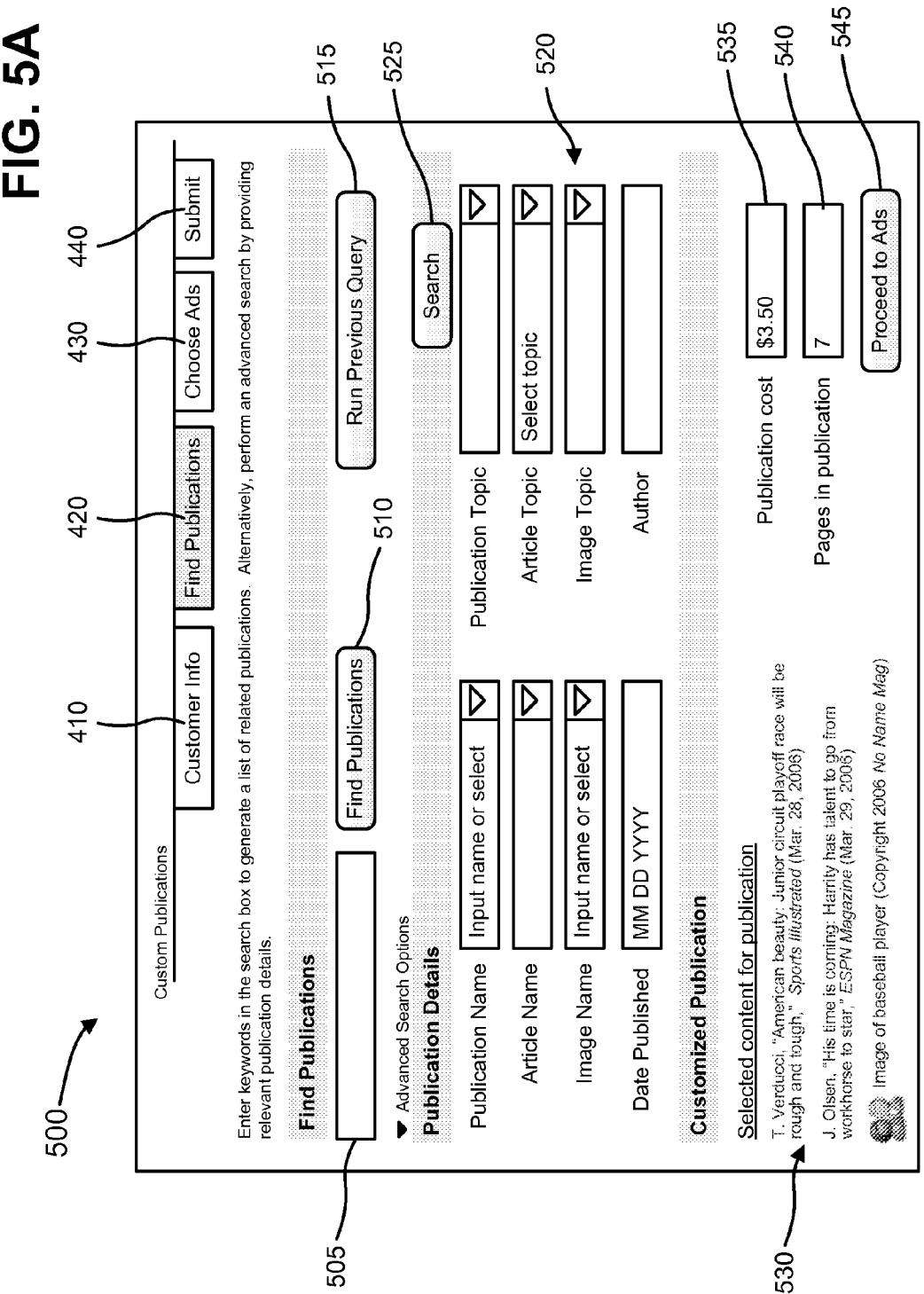

FIGS. 5A and 5B are further exemplary diagrams showing use of customer interface documents when selecting content. FIGS. 5A and 5B depict exemplary customer interface documents 500, 550 that may be displayed when "Find Publications" tab 420 is selected by the user. As shown in FIG. 5A, a "Find Publications" section may be provided and may include a field 505 to enter a content search query (e.g., to search the content provided by the content providers in FIG. 1). Once a search query is entered in field 505, a user may select a "Find Publications" button 510 to run the search query and generate content matching the query.

In one implementation, for example, a user may run a previously entered search query by selecting a "Run Previous Query" button 515. In such an implementation, a user may be presented with previous search queries assembled in some type of order (e.g., by date, by topic, etc.). A user may then select which previous query or queries to run. This may enable a user to periodically create a customized publication that contains content related to a certain topic but which may be quickly updated as new content about that topic is created.

As shown in FIG. 5A, customer interface document 500 may include a "Publication Details" section that may permit the user to input a variety of content details 520 to include in an advanced content search query. For example, content may be searched by inputting or selecting a publication name, an article name, an image name, etc. Content may be searched by inputting or selecting a publication topic, an article topic, an image topic, etc. Topical input may aid the user in searching for content when the name of a publication, article, image, etc. is not known to the user. Content may be searched based on the date the content was published and/or based on an author name. Although FIG. 5A shows exemplary search query options, other search query options may be included. For example, the price of the content, the type of the content (e.g., image, electronic media, printed publication, etc.), and/or any other information deemed to be useful to either a user and/or a content provider in locating content to be provided in a customized publication may be provided in "Publication Details" section. Once content details 520 are entered, an advanced search query may be executed (e.g., upon selection of a "Search" button 525).

In one implementation consistent with principles of the invention, a user may input the frequency of a publication. For example, a user may select preferences to receive a publication on a frequency basis (e.g., once a week) and then may have the option of changing the preferences to modify the content of the periodic publication.

As further shown in FIG. 5A, customer interface document 500 may include a "Customized Publication" section that may provide a variety of information regarding a customized publication. For example, in one implementation, a list 530 of the content selected for the customized publication may be provided. As shown in FIG. 5A, two articles (e.g., T. Verducci, "American beauty: Junior circuit playoff race will be rough and tough," *Sports Illustrated* (Mar. 28, 2006) and J. Olsen, "His time is coming: Harrity has talent to go from workhorse to star," *ESPN Magazine* (Mar. 29, 2006)) and an image (e.g., Image of baseball player (Copyright 2006 *No Name Mag*)) may constitute the currently selected content. A user may delete previously selected content if they no longer wish to include it in customized publication (e.g., by right clicking and selecting delete from a menu). "Customized publication" section may include a publication cost 535 and/or the number of publication pages 540 based on the content selected. Once a user is satisfied with the content selected, the user may proceed to advertisement selection (e.g., by selecting a "Proceed to Ads" button 545).

If the user executes a search query, search results 555 may be provided in customer interface document 550, as shown in FIG. 5B. Search results 555 may be generated by scanning a content database (e.g., the content information portion of the custom publication creator of FIG. 1) and providing the content that may match the search criteria input by the user. Search results 555 may include any content that may match the user search query and may be arranged in a variety of ways (e.g., by date, relevance, cost, etc.). For example, in the exemplary implementation shown in FIG. 5B, search results may be displayed (e.g., "Surfing for school spirit" and "SURFING") along with information corresponding to the search results (e.g., relevance, the author name, the date created, the number of words in the content, an identification number of the content, a snippet discussing the content, the cost of the content, etc.). A user may select which content to purchase (e.g., by selecting a "Purchase" button 560), and the "Customized Publication" section may be updated accordingly (e.g., the selected content may be added to list 530, publication cost 535 may be updated, and pages in publication 540 may be updated).

Once a user is satisfied with the content selected for the customized publication, the user may proceed to advertisement selection (e.g., by selecting or clicking on "Choose Ads" tab 430 or "Proceed to Ads" button 545), and exemplary customer interface documents 600 and 605, shown in FIGS. 6A and 6B, may be provided. As shown in FIG. 6A, a "Find Advertisements" section may be provided and may include a field 610 to enter an advertisement search query (e.g., to search the advertisements provided by the advertisers in FIG. 1). Once a search query is entered in field 610, a user may select a "Find Advertisements" button 620 to run the search query and generate advertisements matching the query.

Although not shown in FIG. 6A, a user may run a previously entered search query in a manner similar to the way a previous content search query may be run (as described above in connection with FIG. 5A). In such an implementation, a user may be presented with previous search queries assembled in some type of order (e.g., by date, by topic, etc.). A user may then select which previous query or queries to run.

In one implementation consistent with principles of the invention, a user may automatically select advertisements (e.g., by selecting an "Automatically Select Ads" button 630). In such an implementation, advertisements may be automatically generated based on a variety of information. For example, some or all of the advertisements may be automatically generated based on the content selected (e.g., if a user selects articles about trucks, then advertisements from truck manufacturers (e.g., Ford F-150) may be automatically generated in the customized publication), and/or based on something entirely different (e.g., the user profile). In another implementation, advertisers may be automatically linked to certain content. For example, Ford might pay a premium to have its truck ads automatically generated whenever a user selects articles from relevant content, e.g., "Sport Truck" magazine, or if the user has a specific profile (e.g., a specific demographic).

The premium paid by an advertiser may need to be balanced against the relationship between the content and the advertisement. For example, the relevance of the content to the advertisement and the customer should be a factor considered when suggesting advertisements so as to avoid a situation where the highest priced advertisements are always being recommended regardless of the content selected or customer involved. For example, an advertisement from the National Rifle Association (NRA) touting the benefits of gun ownership may not be appropriate to recommend to a user who selected content about gun control and/or opted to exclude political ads, even if the NRA paid a premium for its advertisement. In another implementation, advertisers may be able to exclude certain demographics or even individuals, e.g., a customer who has never purchased from the advertiser, or is a heavy purchaser from the advertiser. Advertisers may exclude heavy purchasers because advertising may be unnecessary for such customers (i.e., the customers are already sold on the advertisers products).

In another implementation, advertisements may be automatically generated based on the geography, behavior, demographics, collaborative filtering, psychographics (e.g., implicit psychographic profile), preferences implied by user selections, and/or any other data collected from the user during the registration process.

In still another implementation, advertisements may be automatically generated based on user feedback. User feedback may include, for example, the selection (or de-selection) of the advertiser and/or advertisement(s), the longevity of the selection of an advertiser and/or advertisement(s), the correlation between selection/de-selection and placement of an advertisement, and/or longevity/confidence in a psychographic profile based on the consistency of the advertisement selection.

As shown in FIG. 6A, customer interface document 600 may include an "Advertisement Details" section that may permit the user to input a variety of advertisement details 640 to include in an advanced advertisement search query. For example, advertisements may be searched by inputting or selecting an advertisement name, an advertisement topic, a product name, a product topic, and/or the date the advertisement was created. Although FIG. 6A shows exemplary search query options, other search query options may be included. For example, the type of the advertisement (e.g., image, electronic media, printed publication, etc.), and/or any other information deemed to be useful to either a user and/or an advertiser in locating advertisements to be provided in a customized publication may be provided in the "Advertisement Details" section. Once advertisement details 640 are entered, an advanced search query may be executed (e.g., upon selection of a "Search" button 650).

In one implementation, as further shown in FIG. 6A, the "Advertisement Details" section may recommend advertisements based on the user profile (e.g., by selecting a "Recommend ads based on my profile" button). This may allow advertisements to be automatically recommended based on any data collected from the user during the registration process and/or based on user feedback. In another implementation, the "Advertisement Details" section may further recommend advertisements based on content selected by the user (e.g., by selecting a "Recommend ads based on selected content" button). In still another implementation, the "Advertisement Details" section may recommend advertisements based on prior and/or current user search queries (e.g., by selecting a "Recommend ads based on my searches" button).

As shown in FIG. 6A, customer interface document 600 may include a "Customized Publication" section that may provide a variety of information regarding the customized publication. For example, in one implementation, a list 660 of the advertisements selected for the customized publication may be provided. As shown in FIG. 6A, two advertisements (e.g., We have all your baseball needs here, bats, gloves, etc., *Dick's Sporting Goods* (Copyright 2006 *Dick's Sporting Goods*), and Shop for all your baseball stuff here and save, *Sports Authority* (Copyright 2006 *Sports Authority*)) may constitute the currently selected advertisements. "Customized publication" section may include publication cost 535 and/or number of publication pages 540. A user may delete an already selected advertisement if they no longer desire to include it in customized publication (e.g., by right clicking and selecting delete from a menu). Once a user is satisfied with the content and advertisements selected, the user may proceed to submit publication section (e.g., by selecting a "Submit Publication" button 670).

Although not shown in FIG. 6A, the "Customized Publication" section may include list 530 of the content selected (shown in FIG. 5A) alternatively to and/or additionally with list 660 of the advertisements selected.

In one implementation consistent with principles of the present invention, the cost of the customized publication may be tied to the number of advertisements provided in the publication. For example, a customized publication may cost more to have fewer advertisements included within the publication. Conversely, a customized publication may have a lower cost if the user is willing to accept more advertisements. For example, a user may wish to have no advertisements in a customized publication, but may incur the full cost of the publication, without any advertisement reductions.

If the user executes an advertisement search query, search results 680 may be provided in customer interface document 605, as shown in FIG. 6B. Search results 680 may be generated by scanning an advertisements database (e.g., the advertisement information portion of the custom publication creator of FIG. 1) and providing the advertisements that may match the search criteria input by the user. Search results 680 may include any number of advertisements that may match the user search query and may be arranged in a variety of ways (e.g., by date, relevance, cost, etc.). For example, in the exemplary implementation shown in FIG. 6B, search results may be displayed (e.g., "Ron Jon Surf Shop" and "Dick's Sporting Goods") along with information corresponding to the search results (e.g., relevance, the author name, the date created, an identification number of the advertisement, a snippet discussing the advertisement, etc.). A user may select which advertisements to include in the customized publication (e.g., by selecting a "Select Ad" button 690), and the "Customized Publication" section may be updated accordingly (e.g., the selected advertisement may be added to list 660, publication cost 535 may be updated, and pages in publication 540 may be updated).

Although not shown in FIG. 6B, in one implementation consistent with principles of the invention, an amount that an advertisement may reduce a customized publication cost may be provided with search results 680. This way a user may be able to select advertisements that may maximize the cost reduction of the customized publication. This may be tied to how much an advertiser pays for an advertisement. For example, an advertiser may pay a premium for an advertisement, and the advertisement may reduce a customized publication cost greater than other advertisements. This, in turn, may entice users to select the advertisement over other less cost reducing advertisements, and may ensure an advertiser that the advertisement gets selected by a user.

Once a user is satisfied with the content and advertisements selected for the customized publication, the user may proceed to request the customized publication (e.g., by selecting or clicking on "Submit" tab 440 or "Proceed to Publication Submission" button 670), and a customer interface document 700, as shown in FIG. 7, may be provided. As shown in FIG. 7, a "Submit Publication" section may be provided and may include a list 710 of the content and advertisements selected by the user for the customized publication.

The "Submit Publication" section may include a distribution method menu 720 from which a user may select the distribution format of the customized publication. The "Submit Publication" section may also enable a user to make changes to the customized publication (e.g., via selection of a "Make changes to publication?" button 730), to preview the customized publication (e.g., via selection of an image 740), and/or to submit the customized publication (e.g., via selection of a "Submit publication" button 750). The customized publication may be distributed in a variety of formats and/or ways, e.g., a hard copy format and/or a machine viewable format. For example, in one implementation, the customized publication may be printed on demand (e.g., by the customized publication creator of FIG. 1) and mailed to the user. In another implementation, an electronic version (e.g., in Adobe PDF format or some other machine viewable format) of the customized publication may be downloaded by the user or emailed to the user. Such an electronic version may be provided for reference purposes, even if a printed version of the customized publication is requested. In still another implementation, the customized publication may be printed at any print pickup station located at any retail outlet. For example, the customized publication may be printed at a print pickup station located in retail stores (e.g., Target or Safeway) similar to the way in which consumers may send their pictures or picture preferences from the Internet to a retail store or select their picture options in the retail store. Such retail stores may also include a customer interface kiosk which may enable creation and/or printing of the customized publication.

In still a further implementation, any retail outlet or publisher may connect to the customized publication creator and print the customized publications for users. Such retailers or publishers may utilize such printing as a mechanism to promote their products or services. For example, Target may provide printing services for the customized publication at a reduced cost in exchange for enabling Target advertisements to be displayed in the customized publication. This printing service may be conducted online (e.g., via the Internet) or at the retail outlet. In still another implementation, any other facility (e.g., public libraries, universities, printers, etc.) may print the customized publication in a similar manner.

Content Provider Interface

FIG. 8 is an exemplary diagram of a content provider interface document 800 for receiving content provider information. Content provider interface document 800 may be provided in a variety of ways. For example, in one implementation, content provider interface document 800 may be provided via the Internet. As shown in FIG. 8, content provider interface document 800 may include a "Content Submission" section that may have a field 810 to upload any of the various types of content discussed above in connection with FIG. 1. Content may be uploaded by the largest publishers to the smallest independent authors or online providers (e.g., a blogger). For example, in one implementation, Newsweek magazine may upload its weekly articles, images, etc. to the custom publication creator, and the custom publication creator may store this information in its content information portion along with previous information obtained from Newsweek. In another implementation, an independent author/journalist or online provider (e.g., a blogger) may provide his/her article(s) to the custom publication creator for storage within the content information portion.

A proposed fee 820 may be provided in the "Content Submission" section. This may or may not be the final fee agreed upon between the content provider and the owner of the custom publication creator. Rather, a large variety of fee arrangements may be set up between these parties. For example, in one implementation, a publisher may distribute its content for a set licensing fee that has been previously negotiated between the content provider and the owner of the custom publication creator. In another implementation, a publisher may recommend a fee per each content provided (e.g., a price based on the size of an article), and may negotiate each fee with the owner of the custom publication creator. In still another implementation, the owner of the custom publication creator may accept the recommended fee for the content and charge the user this fee (and maybe a premium) for the content. This may push pricing decisions on to the content provider so that content providers do not charge so high of a price that no one will select their content. In still a further implementation, the content providers may be given a share of the revenues obtained from the advertisers by the owner of custom publication creator in exchange for reduced content fees. In another implementation, an auction-based system may be created (e.g., for users who select content in certain categories) where users may select the lowest priced, the most frequently requested, and/or the highest rated content.

The "Content Submission" section may enable a content provider to automatically load new content (e.g., via selection of an "Automatically load new content" button 830). For example, in one implementation, a periodic content provider (e.g., Newsweek) may automatically load all of its periodic content (e.g., the content of this week's Newsweek) by selecting button 830. In another implementation, the content provider may automatically load new content at periodic intervals directly to the content information portion of custom publication creator. For example, Newsweek may automatically load the upcoming week's content to the content information portion the night before the content is to be published in Newsweek magazine. Such an arrangement may prevent the need to use "Automatically load new content" button 830, and provide content providers with a direct mechanism for loading content.

As further shown in FIG. 8, a target audience for the content may be set by a content provider by selecting a "Target audience for content" button 840 of the "Content Submission" section. For example, a content provider may select any information about a user to whom it desires to target its content. In one implementation, a content provider may specify any of the following information about a target user: geography, behavior, demographics, collaborative filtering, psychographics, preferences implied by user selections, and/or any other data collected from the user during the registration process.

In another implementation, a content provider may target an audience based on user feedback, for example, the selection (or de-selection) of the content provider and/or content, the longevity of the selection of the content provider and/or content, the correlation between selection/de-selection and placement of content, and/or longevity/confidence in a psychographic profile based on the consistency of the content selection.

The "Content Submission" section of FIG. 8 may include a list 850 of the content currently provided by the content provider (e.g., to the custom publication creator). For example, in one implementation, a content provider may be able to delete any content, e.g., in lieu of new content, because the content was not selling, because the content was not timely, etc. In another implementation, a content provider may wish to replace all content currently provided with new content on a periodic basis.

As further shown in FIG. 8, content provider interface document 800 may include a "Content Report" section that may provide a variety of financial information 860 regarding content. In one implementation, for example, the content distributed last period (i.e., where a period may be set at any time interval, e.g., monthly) may be provided and may include a listing of the content, the number of copies sold of the content, and the price or fee charged per copy of each content.

In another implementation, the revenue generated by the content may be provided and may include the revenue achieved by the content, the revenue achieved by advertisements, and the total revenue. The revenue achieved by the content may be based on the content sold, a fixed licensing fee for the content, and/or any other financial arrangement set between the content provider and the owner of the custom publication creator. The revenue achieved by advertisements may be based on financial arrangements between the content provider and the advertisers and/or between the content provider and the owner of the custom publication creator. For example, ad revenue may be tied to the number of times an advertisement is recommended in connection with content owned by the content provider.

Revenue may be paid by the owner of the custom publication creator to the content provider in a variety of ways. For example, in one implementation, the custom publication creator may provide billing, payment, and subscription management online for the content providers, which may avoid the costs and headaches involved in current systems, e.g., manual, paper-intensive, postage-intensive, follow-up for renewals, or other systems currently used by many content providers.

Although FIG. 8 shows periodic financial information 860, the "Content Report" section may include other financial information, e.g., annual financial information, inception to date financial information, advertising revenue details, and/or any other financial information deemed useful to content providers. As further shown in FIG. 8, a profile section 870 may be provided. Profile section 870 may include a variety of information (e.g., a name of a content provider, a type of content, an address of the content provider, a contact person for the contact provider, etc.), and may enable a user to update the information (e.g., via selection of an "Update Profile?" button).

In one implementation consistent with principles of the invention, the uploaded content, the proposed fee, the automatically loaded content, and the target audience information may be provided electronically to a content database (e.g., the content information portion of the custom publication creator of FIG. 1). In another implementation, the content, fee, and target information may be provided in printed form to the owner of custom publication creator, and input into the content information portion (e.g., via scanning content, data entry, etc.).

Although FIG. 8 shows the content providers connecting to the custom publication creator to provide content, in another implementation consistent with principles of the invention, the custom publication creator may connect to some or all of the content providers and extract the information from the content providers. For example, if the custom publication creator is granted access to content, it may be able crawl through the content and select content desired to be offered by the custom publication creator. This may be accomplished in a manner similar to the way current news aggregation services operate.

Advertiser Interface

FIGS. 9A and 9B are exemplary diagrams of advertiser interface documents 900 and 905 for receiving advertiser information. Advertiser interface documents 900 and 905 may be provided in a variety of ways. For example, in one implementation, advertiser interface documents 900 and 905 may be provided via the Internet. As shown in FIG. 9A, advertiser interface document 900 may include an "Ad Submission" section where an advertiser may view a list 910 of current advertisements (e.g., in the advertisement information portion of the custom publication creator of FIG. 1), and may decide whether to keep or delete a current ad (e.g., via the selection of buttons 920). The "Ad Submission" section may enable an advertiser to create a new advertisement, e.g., upon selection of a "Create a new ad" button 930. When an advertiser selects "Create a new ad" button 930, advertiser interface document 905 shown in FIG. 9B may be displayed, as discussed in more detail below.

As further shown in FIG. 9A, advertiser interface document 900 may include a "Target Content or Audience" section where an advertiser may provide information 940 to target specific content or information 950 to target a specific audience of users. For example, as shown in FIG. 9A, an advertiser may target content based on the content name, content price, content circulation, and/or any other content-related information deemed to be important to an advertiser. An advertiser may target an audience of users based on gender, age, education level, income level, and/or any of the other target information discussed above in connection with FIG. 6A (e.g., demographics, psychographics, etc.).

As shown in FIG. 9A, advertiser interface document 900 may include an "Ad Report" section that may provide a list 960 of advertisements distributed by the custom publication creator (e.g., last period). An advertiser may use list 960 to decide whether to keep an advertisement or delete an advertisement. For example, an advertiser may wish to delete underperforming advertisements and keep advertisements achieving distribution goals. List 960 may provide financial information regarding advertisements, e.g., the number of copies distributed of an ad, the cost per copy of the ad, the content provided with the ad, the average demographics of the users viewing the ad, etc.

The cost per ad may be negotiated between the advertiser and the owner of the custom publication creator. For example, in one implementation, the custom publication creator may set a flat fee for all advertisements of an advertiser. In another implementation, an advertiser may be willing to pay a premium for an advertisement(s) so that the advertisement(s) is/are distributed more frequently with relevant content, as opposed to other relevant ads not paying the premium. In still another implementation, an auction-based advertisement system may be utilized where advertisers may auction their advertisements (e.g., the highest paying advertiser may win an auction in a specific category of advertisements).

Although FIG. 9A shows periodic financial information 960, the "Ad Report" section may include other financial information, e.g., annual financial information, inception to date financial information, more demographic details, and/or any other financial information deemed useful to advertisers.

In one implementation consistent with principles of the invention, the new advertisements, the target content information, and the target audience information may be provided electronically to an advertisement database (e.g., the advertisement information portion of the custom publication creator of FIG. 1). In another implementation, the new advertisements, the target content information, and the target audience information may be provided in printed form to the owner of custom publication creator, and input into the advertisement information portion (e.g., via scanning, data entry, etc.).

Although FIG. 9A shows the advertisers connecting to the custom publication creator to provide ads, in another implementation consistent with principles of the invention, the custom publication creator may connect to some or all of the advertisers and extract the ads from the advertisers. For example, if the custom publication creator is granted access to the ads, it may be able crawl through the ads and select ads desired to be offered by the custom publication creator. This may be accomplished in a manner similar to way current news aggregation services operate.

When an advertiser selects "Create a new ad" button 930, advertiser interface document 905 shown in FIG. 9B may be displayed. As shown in FIG. 9B, advertiser interface document 905 may include an advertisement preview section 970 for rendering the appearance of an ad, given advertiser inputs in an advertisement input section 980. An advertiser may input (and advertisement preview section 970 may render) an ad headline (e.g., "Fake Ad"), an image file (e.g., "User image"), descriptive text for the ad (e.g., "Description"), a logo file (e.g., may be selected or a logo may be added), a display URL (e.g., "www.fakead.com"), a telephone number (e.g. "(800) 888-8888"), and an ad name (e.g., "fakead"). The telephone number and/or the URL may be used to generate sales and/or to track user response to the ad. The ad information may be saved by an advertiser via selection of a "Save" button 990.

Although FIG. 9B shows exemplary advertisement information that may be provided for an ad, other ad information may also be provided. For example, advertisement information may include an address, sales events, and/or any other information deemed important to an advertiser in making sales.

Providing advertisements matched with content and/or specifically selected by a user provides many advantages to advertisers. For example, such an arrangement may raise cost per thousand impressions (CPM) advertising because advertisers may have the direct identification of potential customers. Such any arrangement may enable advertisers to gather consumer behavioral and/or psychographic information that is currently difficult to obtain. Advertisers may only have to create one version of their ads for a given logical size, which may enable advertisers to save in ad creation costs.

Exemplary Processes

FIGS. 10A-12 are flowcharts of exemplary processes for the creation of a customized publication containing personalized content and advertisements according to implementations consistent with principles of the present invention. The process of FIGS. 10A and 10B may generally be described as obtaining and processing information associated with content and advertisements. The process of FIGS. 11A-11C may generally be described as creating a customized publication containing personalized content and advertisements. The process of FIG. 12 may generally be described as automatically creating and/or recommending a customized publication based on user provided information and/or information about the user.

The processes of FIGS. 10A-12 may be performed by one or more software and/or hardware components within a client/server entity, such as one or more of clients 210 and/or servers 220-240. In another implementation, the processes may be performed by one or more software and/or hardware components within another device or a group of devices separate from or including clients 210 and/or servers 220-240.

Obtaining and Processing Content and Advertisements

Figure 10A:
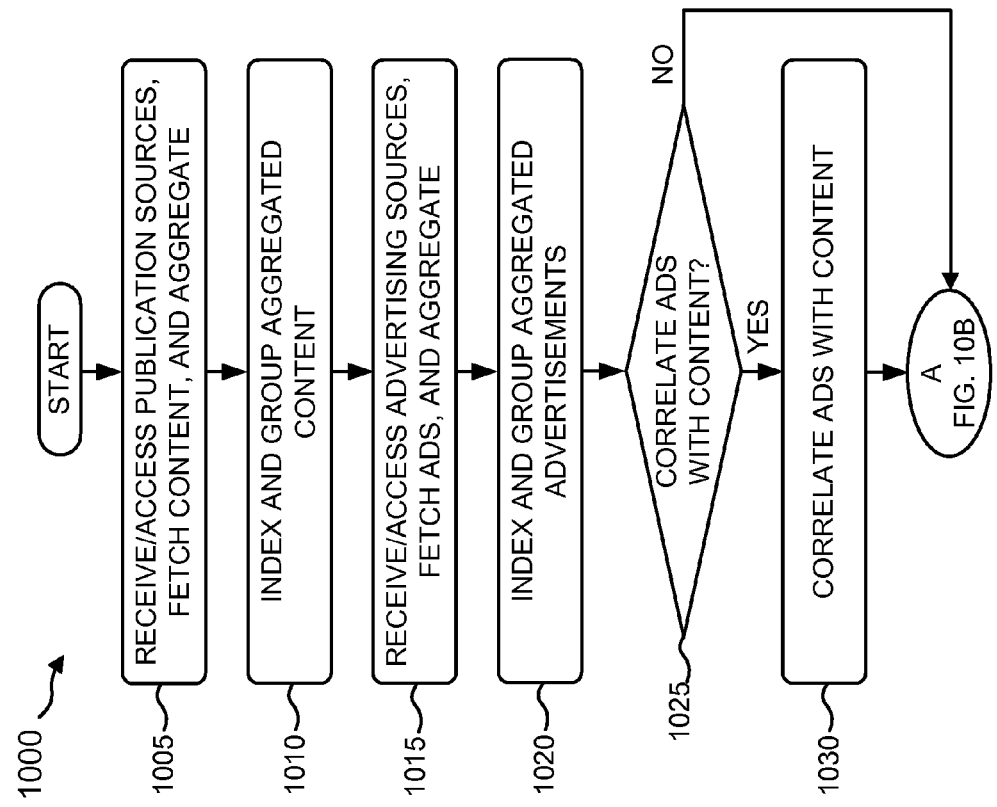
FIGS. 10A and 10B are flowcharts of an exemplary process for obtaining and processing information associated with content and advertisements according to an implementation consistent with principles of the invention.
Figure 10B:
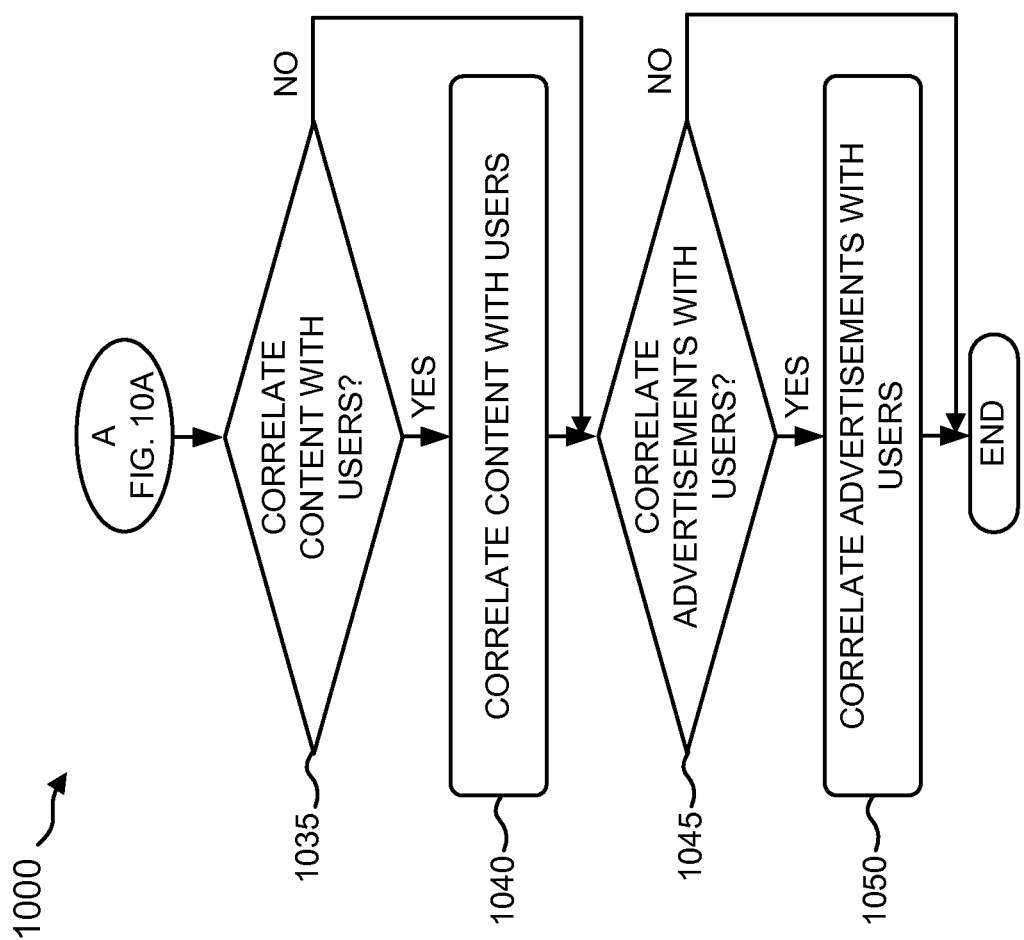

A process 1000 of FIGS. 10A and 10B may begin by receiving and/or accessing publication sources, fetching the content, and aggregating the content (block 1005). For example, in one implementation as described above in connection with FIG. 8, content provider interface document 800 may include field 810 to upload any various types of content discussed above in connection with FIG. 1, and may include field 820 to set a proposed fee for the content. In another implementation described above in connection with FIG. 8, content provider interface document 800 may enable a content provider to automatically load new content (e.g., via selection of "Automatically load new content" button 830). In still another implementation, the custom publication creator may connect to some or all of the content providers and extract the information from the content providers. For example, if the custom publication creator is granted access to content, it may crawl through and select content desired to be offered by the custom publication creator.

As shown in FIG. 10A, the aggregated content may be indexed and grouped using conventional indexing and grouping algorithms (block 1010). For example, the aggregated content may be indexed and grouped based on topical information (e.g., an article about the war in Iraq may be indexed and grouped into a news category and further indexed and grouped into a "war in Iraq" sub-category).

Process 1000 may include receiving and/or accessing advertising sources, fetching the advertisements, and aggregating the advertisements (block 1015). For example, in one implementation as described above in connection with FIGS. 9A and 9B, advertiser interface documents 900 and 905 may enable an advertiser to create a new advertisement, e.g., upon selection of "Create a new ad" button 930. When an advertiser selects "Create a new ad" button 930, advertiser interface document 905 shown in FIG. 9B may enable an advertiser to create and save an advertisement. In another implementation, advertiser interface document 900 may enable an advertiser to automatically load new advertisements, e.g., in a manner similar to the way content may be automatically loaded. In still another implementation, the custom publication creator may connect to some or all of the advertisers and extract the information from the advertisers. For example, if the custom publication creator is granted access to advertisements, it may crawl through and select advertisements desired to be offered by the custom publication creator.

As further shown in FIG. 10A, the aggregated advertisements may be indexed and grouped using conventional indexing and grouping algorithms (block 1020). For example, the aggregated advertisements may be indexed and grouped based on topical information (e.g., an advertisement about Ford trucks may be indexed and grouped into an automotive category and further indexed and grouped into a truck sub-category).

It may be decided whether to correlate or associate the aggregated advertisements with the aggregated content (block 1025). If it is desired to correlate the aggregated advertisements with the aggregated content (block 1025—YES), then the aggregated advertisements may be correlated with the aggregated content in a variety of ways (block 1030). For example, in one implementation, advertisements and content may indexed and grouped in a similar manner so that when specific content is selected (e.g., by a user), advertisements indexed and grouped in the similar manner to the specific content may be recommended for the customized publication. In another implementation as described above in connection with FIG. 9A, the aggregated advertisements may be correlated with the aggregated content based on target content information 940 entered by advertisers (e.g., content name, price, circulation, etc.). If it is not desired to correlate the aggregated advertisements with the aggregated publication (block 1025—NO), then process 1000 may proceed to block A of FIG. 10B.

As shown in FIG. 10B, it may be decided whether to correlate the aggregated content with users (block 1035). If it is desired to correlate the aggregated content with users (block 1035—YES), then the aggregated content may be correlated with the users in a variety of ways (block 1040). For example, in one implementation described above in connection with FIG. 8, a content provider may select a target audience, based on a variety of information, for its content (e.g., upon selection of "Target audience for content" button 840). In another implementation, even if the content provider does not select a target audience for its content, the aggregated content may still be correlated with users. For example, the indexed and grouped aggregated content may be matched with users most likely to be interested in such content (e.g., based on information input by users, user behavior, etc.).

If it is not desired to correlate the aggregated content with users (block 1035—NO), then it may be decided whether to correlate the aggregated advertisements with users (block 1045). If so (block 1045—YES), then the aggregated advertisements may be correlated with users in a variety of ways (block 1050). For example, in one implementation described above in connection with FIG. 9A, the aggregated advertisements may be correlated with users based on target audience information 950 entered by advertisers (e.g., consumer gender, age, education, income level, etc.). In another implementation, even if the advertiser does not select a target audience for its advertisements, the aggregated advertisements may still be correlated with users. For example, the indexed and grouped aggregated advertisements may be matched with users most likely to be interested in such advertisements (e.g., based on information input by users, user behavior, etc.).

If it is not desired to correlate the aggregated advertisements with users (block 1045—NO), then process 1000 may end.

Creating a Customized Publication

A process 1100 of FIGS. 11A and 11B may begin upon receipt of a content search query(ies) from a user (block 1105). For example, in one implementation described above in connection with FIG. 5A, a user may enter a search query at field 505 and select "Find Publications" button 510 to run the search query and generate content matching the query. In another implementation described above in connection with FIG. 5A, a user may be presented with previous search queries assembled in some type of order (e.g., by date, by topic, etc.), and may select which previous query or queries to run. Queries deployed by the user in the past may be ranked based on how recent they are and how frequently they are used, and may be made accessible through a menu placed on the search page. In still another implementation described above in connection with FIG. 5A, "Publication Details" section may permit the user to input a variety of content details 520 to include in an advanced content search query. For example, content may be searched by inputting or selecting a publication name, an article name, an image name, a publication topic, an article topic, an image topic, etc.

If the user desires that a search query(ies) be remembered (block 1110—YES), then the user search query(ies) for selection of content may be stored (block 1115). For example, in one implementation, the custom publication creator may store such search queries upon user request, and the user may later access the stored search queries (e.g., upon selection of "Run Previous Query" button 515 of FIG. 5A). If a user desires that a search query(ies) not be remembered (block 1110—NO), then the aggregated content may be searched based on the user search query(ies) (block 1120). For example, the custom publication creator may execute the search query(ies) on the aggregated content (e.g., stored in the content information portion of the custom publication creator of FIG. 1).

Although not shown in FIG. 11A, instead of using user search quer(ies) to search for content, some or all of the content may be automatically selected and/or recommended to the user in a manner similar to the way ads may be automatically generated (described below in connection with FIG. 11B). For example, in one implementation, some or all of the content may be automatically generated (e.g., selected and/or recommended) based on user feedback, geography, behavior, demographics, collaborative filtering, psychographics, preferences implied by user selections, and/or any other data collected from the user during the registration process.

The results of the search query(ies), i.e., the relevant content, may be recommended and/or provided to the user (block 1125). For example, in one implementation described above in connection with FIG. 5B, search results 555 may be generated by scanning a content database (e.g., the content information portion of the custom publication creator of FIG. 1) and providing the content that may match the search criteria input by the user. Search results 555 may include any number of content and may be arranged in a variety of ways (e.g., by date, relevance, cost, etc.).

As further shown in FIG. 11A, process 1100 may include receiving the content selected by the user (block 1130), and may proceed to block A of FIG. 11B. In one implementation described above in connection with FIG. 5B, a user may select which content to purchase (e.g., by selecting "Purchase" button 560), and the "Customized Publication" section may be updated accordingly (e.g., the selected content may be added to list 530, publication cost 535 may be updated, and pages in publication 540 may be updated).

As shown in FIG. 11B, if a user desires to automatically generate advertisements (block 1135—YES), then advertisements to be included with the selected content may be automatically selected and/or recommended to the user (block 1140). For example, in an implementation described above in connection with FIG. 6A, a user may automatically select advertisements, e.g., by selecting "Automatically Select Ads" button 630. Some or all of the advertisements may be automatically generated based on content selected, linked content, user feedback, geography, behavior, demographics, collaborative filtering, psychographics, preferences implied by user selections, and/or any other data collected from the user during the registration process.

In another implementation, advertisements may be automatically recommended (but not selected). For example, the advertisements may be automatically recommended based on any of the variables described in the preceding paragraph, and a user may select advertisements from the recommended advertisements.

If a user does not desire to automatically generate advertisements (block 1135—NO), then a user search query(ies) for the selection of advertisements may be received (block 1145). For example, in one implementation described above in connection with FIG. 6A, a user may enter a search query in field 610, and may select "Find Advertisements" button 620 to run the search query and generate advertisements matching the query. In another implementation, a user may run a previously entered advertisement search query in a manner similar to the way a previous content search query may be run (as described above in connection with FIG. 5A). In still another implementation described above in connection with FIG. 6A, a user may input a variety of advertisement details 640 (e.g., an advertisement name, an advertisement topic, a product name, a product topic, and/or the date the advertisement was created) to include in an advanced advertisement search query.

If the user desires that a search query(ies) be remembered (block 1150—YES), then the user search query(ies) for selection of advertisements may be stored (block 1155). For example, in one implementation, the custom publication creator may store such search queries upon user request, and the user may later access the stored search queries. If a user desires that a search query(ies) not be remembered (block 1150—NO), then the aggregated advertisements may be searched based on the user search query(ies) (block 1160). For example, the custom publication creator may execute the search query(ies) on the aggregated advertisements (e.g., stored in the advertisement information portion of the custom publication creator of FIG. 1).

The results of the search query(ies), i.e., the relevant advertisements, may be recommended and/or provided to the user (block 1165). For example, in one implementation described above in connection with FIG. 6B, search results 680 may be generated by scanning an advertisement database (e.g., the advertisement information portion of the custom publication creator of FIG. 1) and providing the advertisements that may match the search criteria input by the user. Search results 680 may include any number of advertisements and may be arranged in a variety of ways (e.g., by date, relevance, etc.). In another implementation described above in connection with FIG. 6A, advertisements may be recommended based on the user profile, based on content selected by the user, and/or based on prior and/or current user search queries.

As further shown in FIG. 11B, process 1100 may include receiving advertisements selected by the user and/or automatically selected (block 1170), and then may proceed to block B of FIG. 11C. In one implementation described above in connection with FIG. 6B, a user may select which advertisements to include (e.g., by selecting "Select Ad" button 690), and the "Customized Publication" section may be updated accordingly (e.g., the selected advertisements may be added to list 660, publication cost 535 may be updated, and pages in publication 540 may be updated).

As shown in FIG. 11C, process 1100 may include determining if a user wants to include more content (block 1175). For example, a user may decide to add more content after the content and advertisements have been selected. If more content is desired (block 1175—YES), then process 1100 may return to block C in FIG. 11A and additional content may be selected. If more content is not desired (block 1175—NO), then it may be determined if a user wants to include more advertisements (block 1180). For example, a user may wish to include additional advertisements in order to reduce the cost of the customized publication. If more advertisements are desired (block 1180—YES), then process 1100 may return to block D of FIG. 11B and additional advertisements may be selected.

If more advertisements are not desired (block 1180—NO), then a distribution format preference for the customized publication may be received from the user (block 1185). For example, in one implementation described above in connection with FIG. 7, the customized publication may be printed on demand (e.g., by the customized publication creator of FIG. 1) and mailed to the user. In another implementation, an electronic version (e.g., in Adobe PDF format) of the customized publication may be downloaded by the user or emailed to the user. In still another implementation, the customized publication may be printed at any print pickup station located at any retail outlet. In still a further implementation, any retail outlet or publisher may connect to the customized publication creator and print the customized publications for users.

Process 1100 may include generating the customized publication in the preferred distribution format (block 1190). For example, the customized publication may be mailed to the user, downloaded by the user, emailed to the user, printed at any print pickup station or retail outlet, etc. Process 1100 may include updating accounting information (block 1195). For example, a user credit card may be charged a fee for the customized publication, the financial information (e.g., information contained in the "Ad Report" section of FIGS. 9A and 9B) for the advertisers that have advertisements in the customized publication may be updated, the financial information (e.g., information contained in the "Content Report" section of FIG. 8) for the content providers that have content in the customized publication may be updated, etc.

Automatic Creation/Recommendation of Customized Publication

A process 1200 of FIG. 12 may include producing a content search query(ies) based on user input and/or user information (block 1210). For example, in one implementation, the custom publication creator may formulate a search query(ies) for content based on prior user content search queries. In another implementation, the custom publication creator may produce a search query(ies) based on prior content selected by a user for the customized publication. In still another implementation, the custom publication creator may formulate a content search query(ies) based on information about a user (e.g., demographics, psychographics, etc.).

As further shown in FIG. 12, process 1200 may include retrieving content based on the search query(ies) (block 1220). For example, in one implementation, the custom publication creator may execute the search query(ies) on the aggregated content (e.g., stored in the content information portion of the custom publication creator of FIG. 1), and retrieve a predetermined number of the most relevant content located by the search query(ies).

An advertisement search query(ies) may be produced based on user input and/or user information (block 1230). For example, in one implementation, the custom publication creator may formulate a search query(ies) for advertisements based on prior user advertisement search queries. In another implementation, the custom publication creator may produce a search query(ies) based on prior advertisements selected by a user for the customized publication. In still another implementation, the custom publication creator may formulate an advertisement search query(ies) based on information about a user (e.g., demographics, psychographics, etc.) and/or the content selected by the user.

As further shown in FIG. 12, process 1200 may include retrieving advertisements based on the search query(ies) (block 1240). For example, in one implementation, the custom publication creator may execute the search query(ies) on the aggregated advertisements (e.g., stored in the advertisement information portion of the custom publication creator of FIG. 1), and retrieve a predetermined number of the most relevant advertisements located by the search query(ies).

Process 1200 may include creating and/or recommending a customized publication containing the retrieved content and/or the retrieved advertisements (block 1250). For example, in one implementation, the custom publication creator may generate the customized publication containing the retrieved content and advertisements, and offer the publication for sale to a user. In another implementation, a user may set up automatic generation of the customized publication based on user preferences. For example, a user may wish to create a weekly magazine containing the most recent articles discussing baseball. Such a user may wish to automatically generate such a customized publication without having to go through the process of selecting content and advertisements.

The processes of FIGS. 10A-12 may be performed at any time. In one implementation consistent with principles of the invention, the processes of FIGS. 10A, 10B, and 12 may be performed offline (e.g., prior to a user provided search query and the process of FIGS. 11A-11C). In another implementation, the process of FIGS. 10A and 10B may be performed offline, the process of FIGS. 11A-11C may be performed in response to a user provided search query, and the process of FIG. 12 may be performed when a user logs into the custom publication creator.

Although FIGS. 4-9A show exemplary interfaces for entering information associated with creation of a customized publication, the interfaces depicted therein may be used to display and/or enter any other information that may be relevant to customized publication creation. For example, in one implementation, more or less search criteria may be utilized to search for content and/or advertisements.

Although FIGS. 1-12 show creation of a customized publication that may include personalized content and personalized ads, in an alternative implementation consistent with principles of the invention, the customized publication may only include personalized content, with advertisements being automatically generated and not user selectable. In another alternative implementation consistent with principles of the invention, the systems and methods of the invention may permit personalization of advertisements as part of a publication subscription management service.

CONCLUSION

Systems and methods consistent with principles of the invention may provide an on-demand point-of-sale printed publication containing user selected content from multiple content sources and relevant advertisements (e.g., advertisements selected based on user input, advertisements related to the content, or a combination of the two) from a variety of advertisers. Determination of the relevant advertisements may take into account information about the point-of-sale (e.g., time of day, location, type of store, type of transaction being consummated, etc.) of the printed publication.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 10A-12, the order of the acts may be modified in other implementations consistent with principles of the invention. Further, non-dependent acts may be performed in parallel.

Also, exemplary user interfaces have been described with respect to FIGS. 1 and 4-9B. In other implementations consistent with principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, the method comprising:
   receiving, by a processor of the device and from a user device, a request to create a publication;
   searching, by the processor and based on particular input from the user device, a plurality of content sources to identify particular content for the publication;
   providing, by the processor and to the user device, search queries for advertisements;
   receiving, by the processor and from the user device, selection of one of the provided search queries for advertisements;
   searching, by the processor and, based on the one of the provided search queries for advertisements, a plurality of advertisements to identify particular advertisements, searching the plurality of advertisements being performed independently of searching the plurality of content sources;
   receiving, by the processor, selection of a particular advertisement, from the particular advertisements, for the publication;
   receiving, by the processor and from the user device, input identifying a distribution format for the publication, the distribution format being a printed format;
   receiving, by the processor and from the user device, input identifying a frequency of causing the publication to be provided to a user of the user device;
   creating, by the processor, the publication;
   the publication including the particular content and the particular advertisement;
   causing, by the processor, the publication to be provided to the user, the publication being provided to the user in the printed format,
   periodically recreating, by the processor, the publication at one or more additional times as one or more addition publications based on the input identifying the frequency; and
   causing, by the processor, each of the one or more additional publications to be provided to the user.

2. The method of claim 1, where the particular input identifies a subject matter of interest, and
   where the particular content is identified based on the subject matter of interest.

3. The method of claim 1,
   searching the plurality of content sources includes searching the plurality of content sources based on a search query, and
   where the method further comprises:
      recommending content based on results of searching the plurality of content sources; and
      receiving selection, from the user device, of the particular content from the recommended content.

4. The method of claim 3, further comprising:
   storing the search queries;
      where periodically recreating the publication comprises:
         periodically searching the plurality of content sources based on the stored search query; and
         including at least one result, of periodically searching the plurality of content sources, in each of the one or more additional publications.

5. The method of claim 1, further comprising:
   storing the selected one of the provided search queries for advertisements;
      where periodically recreating the publication comprises:
         periodically searching the plurality of advertisements based on the stored one of the provided search queries for advertisements; and
         including a result, of periodically searching the plurality of advertisements, in each of the one or more additional publications.

6. The method of claim 1, further comprising:
   receiving content from a plurality of content providers;
   aggregating the received content,
      where aggregating the content comprises at least one of:
         receiving an upload of content from at least one of the plurality of content providers, or
         extracting content from one or more of the plurality of content providers after connecting to the one or more of the plurality of content providers; and
      indexing and grouping the aggregated content.

7. The method of claim 1, further comprising:
   receiving advertisements from a plurality of advertisers;
   aggregating the advertisements, where aggregating the advertisements comprises at least one of:
      receiving an upload of advertisements from one or more of the plurality of advertisers, or
      extracting advertisements from at least one of the plurality of advertisers; and
   indexing and grouping the aggregated advertisements.

8. The method of claim 1, where the provided search queries for advertisements are based on the identified personalized content.

9. The method of claim 1, where the provided search queries for advertisements are based on information associated with the user.

10. The method of claim 1, further comprising recommending one or more of the particular advertisements based on information associated with the user.

11. The method of claim 1, further comprising:
providing the customized publication in a machine viewable format.

12. The method of claim 1, further comprising:
searching content based on one or more preferences associated with the user;
recommending content based on one or more results of searching the content based on the one or more preferences associated with the user; and
receiving selection of the particular content from the recommended content.

13. A method performed by a device, the method comprising:
receiving, by a processor of the device and from a user device, a request to create a publication;
identifying, by a processor of the device and based on a first input from the user device, particular content received from a plurality of content sources;
searching, by the processor, advertisements based on a second input from the user device;
providing, by the processor and to the user device, particular advertisements based on searching the advertisements;
receiving, by the processor and from the user device, selection, of a particular advertisement from the advertisements provided to the user device;
receiving, by the processor and from the user device, input identifying a distribution format for the publication,
the distribution format being a printed format;
receiving, by the processor and from the user device, input identifying a frequency of causing the publication to be provided to a user of the user device;
creating, by the processor and based on the input identifying the frequency, the publication:
the publication including the particular content and the particular advertisement:
the publication being periodically recreated at one or more additional times based on the input identifying the frequency; and
causing, by the processor and based on the input identifying the frequency, the publication to be periodically provided to the user of the user device in the distribution format.

14. The method of claim 13, where the publication comprises an on-demand point-of-sale printed publication that includes the particular content and the particular advertisement.

15. A method performed by a device, the method comprising:
receiving, by a processor of the device, content from a plurality of content providers;
aggregating, by me processor, the content;
selecting, by the processor, particular content from the aggregated content,
the particular content being selected based on a first input from a user device;
receiving, by the processor, advertisements from a plurality of advertisers;
aggregating, by the processor, the advertisements;
searching, by the processor, the aggregated advertisements based on a second input from the user device;
recommending, by the processor, advertisements based on results of searching the aggregated advertisements;
receiving, by the processor and from the user device, selection of a particular advertisement from the recommended advertisements;
receiving, by the processor and from the user device, input identifying a distribution format for the publication,
the distribution format being a printed format;
receiving, by the processor and from the user device, input identifying a frequency of causing the publication to be provided to a user of the user device;
creating, by the processor, the publication,
the publication including the particular content and the particular advertisement,
the publication being provided to the user in the distribution format; and
periodically recreating, by the processor, the publication at one or more additional times as one or more additional publications based on the input identifying the frequency,
the one or more additional publications being periodically provided to the user, based on the input identifying the frequency, in the distribution format.

16. The method of claim 15, further comprising at least one of:
associating the aggregated content with the aggregated advertisements,
where associating the aggregated content with the aggregated advertisements comprises at least one of:
indexing and grouping the aggregated content and the aggregated advertisements in a similar manner, or
associating the aggregated content with the aggregated advertisements based on target content information provided by at least one of the plurality of advertisers;
associating the aggregated content with information that is associated with the user; or
associating the aggregated advertisements with information that is associated with the user.

17. The method of claim 15, further comprising:
indexing and grouping the aggregated content; and
indexing and grouping the aggregated advertisements.

18. A non-transitory computer-readable medium storing instructions, the instructions comprising:
a plurality of instructions which, when executed by one or more processors, cause the one or more processors to:
receive, from a user device, a request to create a publication;
receive, from the user device, information regarding a first search query;
perform a search to identify content, for the publication, based on the first search query;
receive, from the user device, information regarding a second search query;
perform a search to identify advertisements, for the publication, based on the second search query,
the search to identify the advertisements being performed independently of the search to identify the content;
provide the advertisements to the user device;
receive selection, from the user device, of a particular advertisement from the advertisements provided to the user device;

receive, from the user device, input identifying a distribution format for the publication,
the distribution format being a printed format;
receive, from the user device, input identifying a frequency relating to providing the publication to a user of the user device; and
create the publication,
the publication including the content and the particular advertisement,
the publication being provided to the user in the distribution format;
periodically recreate the publication at one or more additional times as one or more additional publications based on the input identifying the frequency,
the one or more additional publications being periodically provided to the user, based on the input identifying the frequency, in the distribution format.

19. A system, comprising:
one or more devices to:
receive, from a user device, a request to create a publication;
receive, from the user device, information regarding a first search query;
receive, from the user device, a search query,
perform, using the search query, a search to identify advertisements for the publication;
provide the advertisements to the user device for display;
receive selection, from the user device, of a particular advertisement from the advertisements provided to the user device;
receive, from the user device, input identifying a distribution format for providing the publication to a user of the user device,
the distribution format being a printed format;
receive, from the user device, input identifying a frequency relating to providing the publication to a user of the user device;
create the publication,
the publication including the content and the particular advertisement,
the publication being provided, to the user, in the distribution format;
periodically recreate the publication at one or more additional times, based on input identifying the frequency, as one or more additional publications; and
cause each of the one or more additional publications to be provided to the user.

20. A device comprising:
a memory to store instructions; and
a processor to execute instructions in the memory to:
receive, from a user device, a request to create a publication,
receive content for the publication,
the content being based on information associated with a user of the user device,
receive, from the user device, a search query,
perform, using the search query, a search to identify advertisements for the publication;
provide the advertisements to the user device for display;
receive selection, from the user device, of a particular advertisement from the advertisements provided to the user device;
receive, from the user device, input identifying a distribution format for providing the publication to a user of the user device,
the distribution format being a printed format,
receive, from the user device, input identifying a frequency relating to providing the publication to a user of the user device,
create the publication,
the publication including the content and the particular advertisement,
cause the publication to be provided to the user,
the publication to be provided, to the user, in the distribution format,
periodically recreate the publication at one or more additional times, based on input identifying the frequency, as one or more additional publications; and
cause each of the one or more additional publications to be provided to the user.

21. A memory device that stores instructions, the instructions comprising:
one or more instructions which, when executed by one or more processors, causes the one or more processors to receive, from a user device, a request to create a publication,
one or more instructions which, when executed by one or more processors, causes the one or more processors to receive content for the publication,
the content being based on information associated with a user of the user device,
one or more instructions which, when executed by one or more processors, causes the one or more processors to receive, from the user device, a search query,
one or more instructions which, when executed by one or more processors, causes the one or more processors to perform a search, based on the search query, to identify advertisements;
provide the advertisements to the user device for display;
one or more instructions which, when executed by one or more processors, causes the one or more processors to receive selection of a particular advertisement, of the identified advertisements, for the publication;
one or more instructions which, when executed by one or more processors, causes the one or more processors to receive, from the user device, input identifying a distribution format for providing the publication to a user of the user device,
the distribution format being a printed format,
one or more instructions which, when executed by one or more processors, causes the one or more processors to receive, from the user device, input identifying a frequency relating to providing the publication to the user of the user device,
one or more instructions which, when executed by one or more processors, causes the one or more processors to create the publication,
the publication including the content and the particular advertisement,
one or more instructions which, when executed by one or more processors, causes the one or more processors to cause the publication to be provided to the user;
one or more instructions which, when executed by one or more processors, causes the one or more processors to periodically recreate the publication at one or more additional times, based on input identifying the frequency, as one or more additional publications; and
one or more instructions which, when executed by one or more processors, causes the one or more processors to cause each of the one or more additional publications to be provided to the user.

22. A method performed by a device, the method comprising, comprising:
  receiving, by a processor of the device and from a user device, a request to create a publication;
  receiving, by the processor of the device and from the user device, input identifying a distribution format for providing the publication to a user of the user device, the distribution format being a printed format;
  receiving, by the processor of the device and from the user device, input identifying a frequency relating to providing the publication to the user of the user device;
  associating, by a processor of the device, a plurality of content search queries with information that is associated with the user;
  periodically searching, by the processor and based on the input identifying the frequency, content using the plurality of content search queries;
  associating, by the processor, a plurality of advertisement search queries with the information that is associated with the user;
  periodically searching, by the processor and based on the input identifying the frequency advertisements using the plurality of advertisement search queries,
    periodically searching the advertisements being performed independently of periodically searching the content; and
  periodically creating, by the processor and based on the input identifying the frequency, the publication,
  the publication including:
    particular content identified based on periodically searching the content, and
    one or more advertisements identified based on periodically searching of the advertisements,
  the publication being periodically provided to the user, based on the input identifying the frequency, in the distribution format.

23. The system of claim 19,
  where the one or more devices further:
  cause the publication to be periodically provided to the user in an electronic format.

24. The device of claim 20, where the processor further executes the instructions in the memory to:
  cause the publication to be provided in or a machine viewable format.

25. The memory device of claim 21, where the instructions further comprise:
  one or more instructions to cause the publication to be provided in an electronic format.

26. The method of claim 22, further comprising:
  causing the publication to be provided in a machine viewable format.

27. A system comprising:
  one or more devices to:
  receive content from a plurality of content sources;
  receive, from a user device of a user, a request to create a publication:
  select particular content, from the content received from the plurality of content sources, for the publication;
  perform a search to identify advertisements for the publication;
  receive, from the user device, input identifying a frequency relating to providing the publication to a user of the user device;
    the distribution format being a printed format;
  receive, from the user device, input identifying a frequency relating to providing the publication to the user of the user device;
  create the publication,
    the publication including the particular content and the particular advertisement;
  cause the publication to be provided to the user,
    the publication being provided, to the user, in the distribution format;
  recreate the publication at one or more additional times, based on the input identifying the frequency, as one or more additional publications; and
  cause each of the one or more additional publications to be provided to the user.

28. The system of claim 27, where the one or more devices are further to:
  perform a search, based on a search query for content and independently of performing the search to identify the advertisements, to identify the particular content from the content received from the plurality of content sources;
  provide the particular content to the user device; and
  receive selection, from the user device, of the particular content for the publication.

29. The system of claim 27, where the one or more devices are further to:
  cause the publication to be provided in an electronic format.

30. The method of claim 13, further comprising:
  searching, independently of searching the advertisements, the plurality of content sources based on a search query for content;
  recommending content based on results of the search query for content sources; and
  receiving selection, from the user device, of the particular content from the recommended content.

* * * * *